(12) United States Patent
Li et al.

(10) Patent No.: US 11,822,071 B2
(45) Date of Patent: Nov. 21, 2023

(54) OPTICAL SCANNER AND ELECTROPHOTOGRAPHIC IMAGE FORMING APPARATUS

(71) Applicant: Zhuhai Pantum Electronics Co., Ltd., Zhuhai (CN)

(72) Inventors: Ronghua Li, Zhuhai (CN); Chao Wang, Zhuhai (CN); Dongning Wang, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 71 days.

(21) Appl. No.: 17/526,866

(22) Filed: Nov. 15, 2021

(65) Prior Publication Data

US 2022/0075181 A1 Mar. 10, 2022

Related U.S. Application Data

(63) Continuation of application No. PCT/CN2020/088676, filed on May 6, 2020.

(30) Foreign Application Priority Data

May 17, 2019 (CN) .......................... 201910416818.4

(51) Int. Cl.
*G02B 26/08* (2006.01)
*G02B 26/12* (2006.01)
(Continued)

(52) U.S. Cl.
CPC ............ *G02B 26/125* (2013.01); *B41J 2/442* (2013.01); *B41J 2/451* (2013.01); *B41J 2/455* (2013.01);
(Continued)

(58) Field of Classification Search
CPC ............. G02B 26/0816; G02B 26/123; G02B 26/124; G02B 26/125; G02B 27/4227;
(Continued)

(56) References Cited

U.S. PATENT DOCUMENTS 5,563,729 A 10/1996 Nakamura et al.
5,828,401 A * 10/1998 Shiraishi .................. B41J 2/471
347/258

(Continued)

FOREIGN PATENT DOCUMENTS

CN 1971338 A 5/2007
CN 101086554 A 12/2007
(Continued)

OTHER PUBLICATIONS

The World Intellectual Property Organization (WIPO) International Search Report With Translation and Written Opinion for PCT/CN2020/088676 date Jul. 28, 2020 4 Pages (including translation).

*Primary Examiner* — Justin Seo
*Assistant Examiner* — Kendrick X Liu
(74) *Attorney, Agent, or Firm* — ANOVA LAW GROUP, PLLC

(57) ABSTRACT

Optical scanner and electrophotographic image forming device are provided. The optical scanner includes a light source; and a first optical unit, a deflection apparatus, and an f-θ lens, which are sequentially arranged along a primary optical axis direction of a light beam emitted from the light source. The light beam emitted from the light source is focused onto a scanning target surface after sequentially passing through the first optical unit, the deflection apparatus, and the f-θ lens. Optical scanning directions of the light beam emitted from the light source include a primary scanning direction and a secondary scanning direction which are perpendicular to each other, and along the primary (Continued)

scanning direction, the f-θ lens satisfies following expressions: SAG1>0, SAG2>0, and 0<(SAG1+SAG2)/d<0.8.

10 Claims, 8 Drawing Sheets

(51) Int. Cl.
 G02B 27/42  (2006.01)
 G03G 15/04  (2006.01)
 G03G 15/043  (2006.01)
 B41J 2/44  (2006.01)
 B41J 2/45  (2006.01)
 B41J 2/455  (2006.01)
 B41J 2/47  (2006.01)

(52) U.S. Cl.
 CPC .......... B41J 2/473 (2013.01); G02B 26/0816 (2013.01); G02B 26/123 (2013.01); G02B 26/124 (2013.01); G02B 26/127 (2013.01); G02B 27/4227 (2013.01); G03G 15/0435 (2013.01)

(58) Field of Classification Search
 CPC . G03G 15/0409; G03G 15/0435; B41J 2/442; B41J 2/451; B41J 2/455; B41J 2/473
 See application file for complete search history.

(56) References Cited

U.S. PATENT DOCUMENTS

| | | | |
|---|---|---|---|
| 6,448,998 B1 | 9/2002 | Suzuki et al. | |
| 6,515,782 B1 | 2/2003 | Harrigan et al. | |
| 2005/0134680 A1 | 6/2005 | Kim et al. | |
| 2006/0001938 A1 | 1/2006 | Kim | |
| 2009/0195849 A1* | 8/2009 | Ichii | G02B 26/124 |
| | | | 359/197.1 |
| 2014/0160546 A1* | 6/2014 | Hoshino | G02B 7/008 |
| | | | 359/206.1 |

FOREIGN PATENT DOCUMENTS

| | | |
|---|---|---|
| CN | 101178478 A | 5/2008 |
| CN | 101226249 A | 7/2008 |
| CN | 101241229 A | 8/2008 |
| CN | 101311771 A | 11/2008 |
| CN | 102033313 A | 4/2011 |
| CN | 109491077 A | 3/2019 |
| CN | 109521562 A | 3/2019 |
| CN | 109633894 A | 4/2019 |
| CN | 109975976 A | 7/2019 |
| DE | 2820073 A1 | 11/1978 |
| EP | 1921481 A2 | 5/2008 |
| EP | 1921481 A3 | 5/2011 |

\* cited by examiner

OPTICAL SCANNER AND ELECTROPHOTOGRAPHIC IMAGE FORMING APPARATUS

CROSS-REFERENCE TO RELATED APPLICATION

This application is a continuation of International Application No. PCT/CN2020/088676, filed on May 6, 2020, which claims priority to Chinese patent application No. 201910416818.4, entitled "Optical Scanning Unit and Electrophotographic Image Forming Apparatus", filed on May 17, 2019, in the China National Intellectual Property Administration, the entirety of which is incorporated herein by their reference.

TECHNICAL FIELD

The present disclosure generally relates to the field of optical image forming and laser printing technology and, more particularly, relates to an optical scanner and an electrophotographic image forming apparatus.

BACKGROUND

One of the most important structural elements in an electrophotographic image forming apparatus (such as laser printer) is an optical scanning unit. The optical scanning unit forms a latent image according to the modulated laser beam of the image data to be imaged on a photoreceptor, and scans laser spots on the surface of the photoreceptor at a regular speed. The optical scanning unit needs to focus the laser beam on the surface of the photoreceptor through an f-θ lens. The optical scanning directions are divided into the primary scanning direction and the secondary scanning direction. The primary scanning direction is the width direction that the light scans the photoreceptor, and the secondary scanning direction is the rotating and moving direction of the optical scanning on the photoreceptor. The primary scanning direction is perpendicular to the secondary scanning direction.

In the optical scanning process, the curvature of the scan line on the surface of the photoreceptor needs to be reduced. The curvature of the scan line is related to the position error of the f-θ lens. The position error of the f-θ lens includes the shape, position change, and scanning magnification error of the f-θ lens. The curvature radius of the incident surface and the exit surface of the f-θ lens greatly affects the scanning magnification and the scanning deviation of the light beam on the photoreceptor. In addition, the scanning deviation can also be caused by the manufacturing error of the deflector or the shake during the deflector operation.

In the existing technology, the f-θ lens has a certain scanning deviation in the optical scanning unit due to different problems such as material and curvature. Therefore, how to reduce the scanning error of an optical scanner has become a technical problem to be solved urgently.

SUMMARY

The objective of the present disclosure is to provide an optical scanner and an electrophotographic image forming device, which can reduce the scanning error of the optical scanner and further improve the image forming quality.

One aspect of embodiments of the present disclosure provides an optical scanner, including a light source; and a first optical unit, a deflection apparatus, and an f-θ lens, which are sequentially arranged along a primary optical axis direction of a light beam emitted from the light source. The light beam emitted from the light source is focused onto a scanning target surface after sequentially passing through the first optical unit, the deflection apparatus, and the f-θ lens; optical scanning directions of the light beam emitted from the light source include a primary scanning direction and a secondary scanning direction which are perpendicular to each other; and along the primary scanning direction, the f-θ lens satisfies following expressions: SAG1>0 and SAG2>0; and 0<(SAG1+SAG2)/d<0.8; where SAG denotes a sag of an incident surface or an exit surface, SAG1 is a Z value of the incident surface of the f-θ lens, and SAG2 is a Z value of the exit surface of the f-θ lens, a primary scanning surface is an X-Z plane in an XYZ coordinate system, a secondary scanning surface is a Y-Z plane in the XYZ coordinate system, and d is a center thickness of the f-θ lens.

Another aspect of embodiments of the present disclosure provides an electrophotographic image forming apparatus. The electrophotographic image forming apparatus includes an optical scanner, including a light source; and a first optical unit, a deflection apparatus, and an f-θ lens, which are sequentially arranged along a primary optical axis direction of a light beam emitted from the light source. The light beam emitted from the light source is focused onto a scanning target surface after sequentially passing through the first optical unit, the deflection apparatus, and the f-θ lens; optical scanning directions of the light beam emitted from the light source include a primary scanning direction and a secondary scanning direction which are perpendicular to each other; and along the primary scanning direction, the f-θ lens satisfies following expressions: SAG1>0 and SAG2>0; and 0<(SAG1+SAG2)/d<0.8; where SAG denotes a sag of an incident surface or an exit surface, SAG1 is a Z value of the incident surface of the f-θ lens, and SAG2 is a Z value of the exit surface of the f-θ lens, a primary scanning surface is an X-Z plane in an XYZ coordinate system, a secondary scanning surface is a Y-Z plane in the XYZ coordinate system, and d is a center thickness of the f-θ lens. The electrophotographic image forming apparatus further includes a photosensitive unit capable of forming a latent image on the scanning target surface, a developing unit that develops the latent image on the photosensitive unit into a toner image, a transfer apparatus that transfers the toner image to a transfer medium, and a fixing apparatus that fixes the toner image on the transfer medium.

Embodiments of the present disclosure include the following beneficial effects.

Embodiments of the present disclosure include the optical scanner and the electrophotographic image forming device. The optical scanner includes the light source, and also includes the first optical unit, the deflection apparatus, and the f-θ lens which are sequentially arranged along the primary optical axis direction of the light beam emitted from the light source. The f-θ lens is used to focus the light beam deflected by the deflection apparatus, such that the light beam forms images on the scanning target surface of the photosensitive unit. The ratio of the sum of the Z value of the incident surface of the f-θ lens and the Z value of the exit surface to the center thickness d of the f-θ lens is between 0 and 0.8, which reduces the probability that the trajectory of the light beam falls on the scanning target surface of the photosensitive drum due to the improper shape design of the incident surface and the exit surface of the f-θ lens. The f-θ lens is set as a single piece, which may reduce the cost of the optical scanner, reduce the curvature sensitivity of the light beam scanning curve of the scanning target surface of the photosensitive unit caused by the position error of the f-θ lens, improve the degree of freedom of optical design layout, reduce installation errors, and improve production efficiency.

BRIEF DESCRIPTION OF THE DRAWINGS

In order to clearly illustrate the technical solutions in exemplary embodiments of the present disclosure, the drawings required to be used in exemplary embodiments are briefly described hereinafter. It should be understood that the following drawings only illustrate certain embodiments of the present disclosure and should not be regarded as the scope limitation. Other related drawings may be obtained according to such drawings by those skilled in the art without creative work.

DETAILED DESCRIPTION

Figure 1:
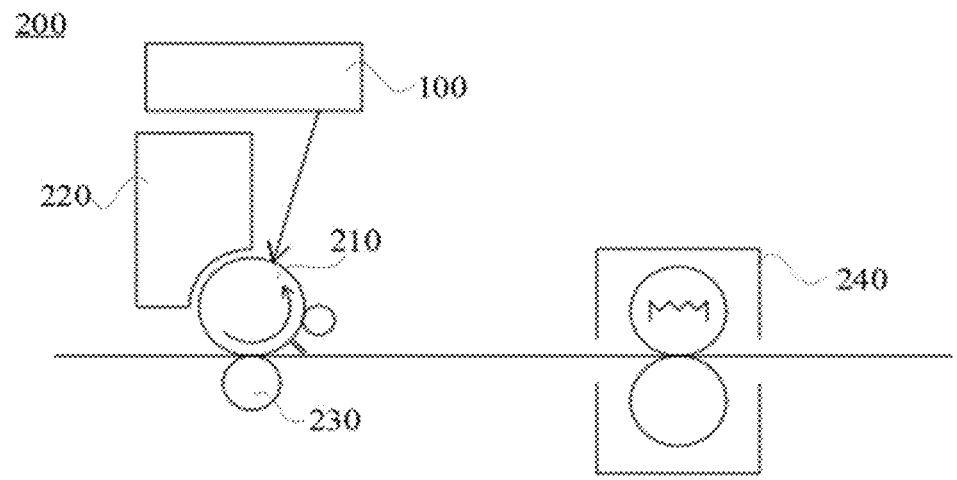
FIG. 1 illustrates a structural schematic of an electrophotographic image forming apparatus according to various embodiments of the present disclosure.

In order to make the objectives, technical solutions, and advantages of embodiments of the present disclosure clearer, the technical solutions in embodiments of the present disclosure are described clearly and completely in conjunction with the accompanying drawings in embodiments of the present disclosure. Obviously, the described embodiments are a part of embodiments of the present disclosure, rather than all embodiments. The components of embodiments of the present disclosure generally described and illustrated in the drawings herein may be arranged and designed in various different configurations.

Therefore, the following detailed description of embodiments of the present disclosure provided in the accompanying drawings is not intended to limit the scope of the claimed disclosure, but merely represents selected embodiments of the present disclosure. Based on embodiments of the present disclosure, all other embodiments obtained by those skilled in the art without creative work shall fall within the protection scope of the present disclosure.

It should be noted that similar reference numerals and letters indicate similar items in the following drawings. Therefore, once a certain item is defined in one drawing, it does not need to be further defined and explained in the subsequent drawings.

In the description of the present disclosure, it should be noted that the orientation or position relationships indicated by the terms "center", "upper", "lower", "left", "right", "vertical", "horizontal", "inner", "outer" and the like are the orientation or position relationships based on the drawings, or the orientation or position relationships that the disclosed product is usually placed in use. It is only for the convenience of describing the present disclosure and simplifying the description, rather than indicating or implying that the device or element referred to must have a specific orientation, be constructed and operated in a specific orientation, and therefore cannot be understood as a limitation of the present disclosure. In addition, the terms "first", "second", "third and the like are only used for distinguishing description, and cannot be understood as indicating or implying relative importance.

In addition, the terms "horizontal", "vertical" and the like do not indicate that the component is required to be absolutely horizontal or overhanging, but may be slightly tilted. For example, "horizontal" only indicates that its direction is more horizontal than "vertical", does not indicate that the structure must be completely horizontal, but can be slightly tilted.

In the description of the present disclosure, it should also be noted that the terms "set", "installation", "connected" and "connected" should be understood in a broad sense, unless otherwise clearly specified and limited. For example, it can be a fixed connection, a detachable connection, or an integral connection; it can be a mechanical connection or an electrical connection; it can be direct connection, or indirect connection through an intermediate medium, and can be the internal communication between two components. For those skilled in the art, the specific meanings of the above terms in the present disclosure can be understood in specific situations.

An optical scanner and an electrophotographic image forming device are provided in the present disclosure, which relates to the technical fields of optical image forming and laser printing and is capable of reducing the scanning error of an optical scanner to improve the image forming quality. The optical scanner includes a light source; and a first optical unit, a deflection apparatus, and an f-θ lens, which are sequentially arranged along a primary optical axis direction of a light beam emitted from the light source. The light beam emitted from the light source is focused onto a scanning target surface after sequentially passing through the first optical unit, the deflection apparatus, and the f-θ lens. Optical scanning directions of the light beam emitted from the light source include a primary scanning direction and a secondary scanning direction which are perpendicular to each other; and along the primary scanning direction, the f-θ lens satisfies following expressions: SAG1>0, SAG2>0, and 0<(SAG1+SAG2)/d<0.8. SAG denotes a sag of an incident surface or an exit surface. SAG1 is a Z value of the incident surface of the f-θ lens, and SAG2 is a Z value of the exit surface of the f-θ lens. A primary scanning surface is an X-Z plane in an XYZ coordinate system, a secondary scanning surface is a Y-Z plane in the XYZ coordinate system, and d is a center thickness of the f-θ lens.

Figure 2:
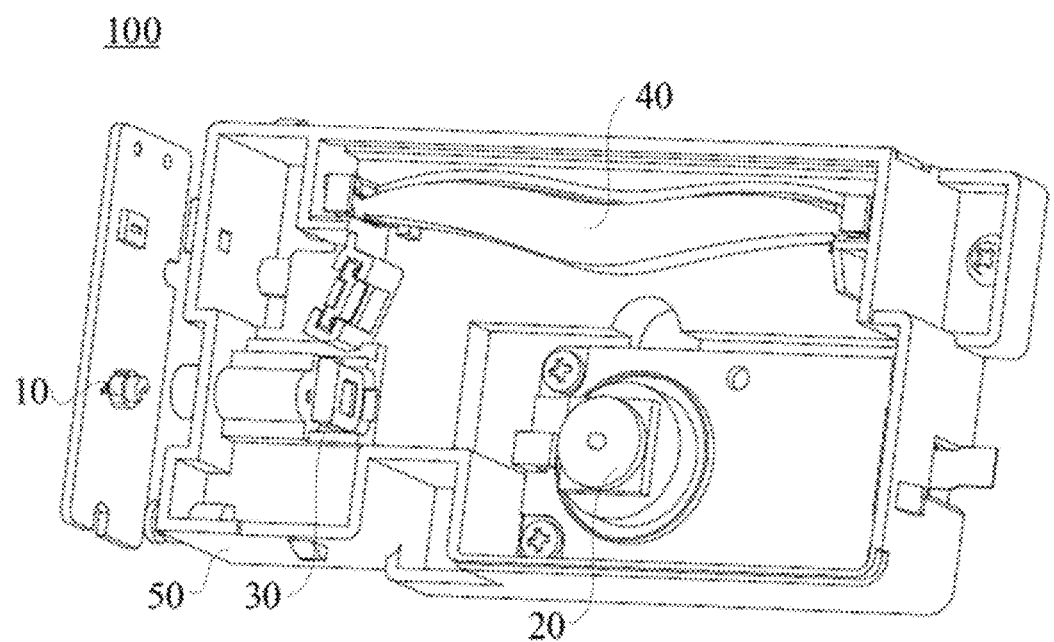
FIG. 2 illustrates a structural schematic of an optical scanner according to various embodiments of the present disclosure.
Figure 3:
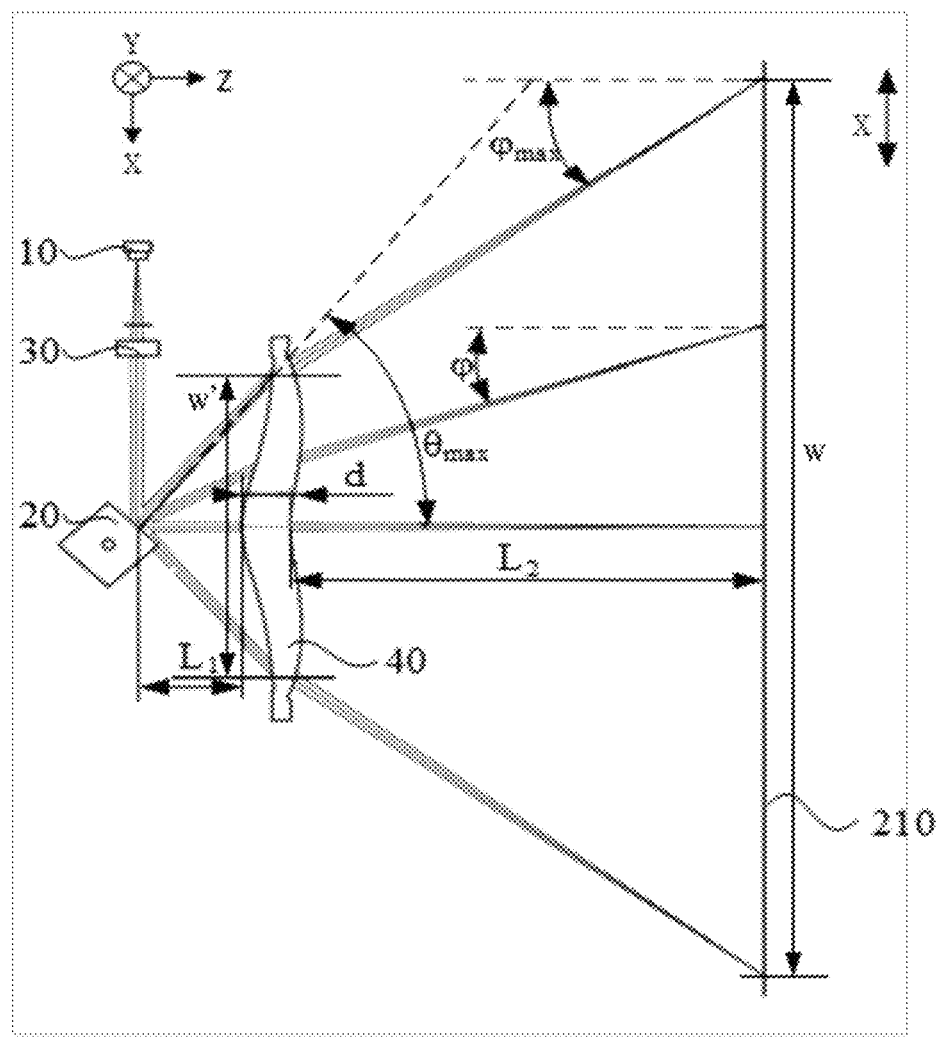
FIG. 3 illustrates a schematic of an optical path in a primary scanning direction of an optical scanner according to various embodiments of the present disclosure.
Figure 4:
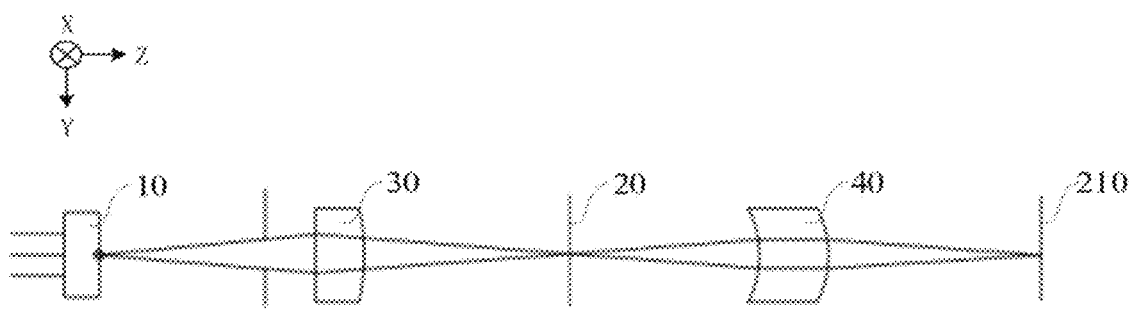
FIG. 4 illustrates a schematic of an optical path in a secondary scanning direction of an optical scanner according to various embodiments of the present disclosure.

As shown in FIGS. 1 and 2, various embodiments of the present disclosure provide an optical scanner 100 including a light source 10, and a first optical unit 30, a deflection apparatus 20, and an f-θ lens 40 which are sequentially arranged along the primary optical axis direction of the light beam emitted from the light source 10. The light beam emitted from the light source 10 may sequentially pass through the first optical unit 30, the deflection apparatus 20 and the f-θ lens 40 and then may be focused onto the scanning target surface of the photosensitive unit 210. The optical scanning directions of the light beam emitted from the light source 10 may include a primary scanning direction and a secondary scanning direction which are perpendicular to each other. The f-θ lens 40 may satisfy the following expressions in the primary scanning direction:

$$SAG1>0 \text{ and } SAG2>0 \tag{1}$$

$$0<(SAG1+SAG2)/d<0.8 \tag{2}$$

where SAG denotes the sag of the incident surface or the exit surface (that is, the depression degree of the surface). As shown in FIGS. 3-4, an XYZ coordinate system that the primary scanning surface is the X-Z plane and the secondary scanning surface is the Y-Z plane is defined; SAG1 is the Z value of the incident surface of the f-θ lens 40; and SAG2 is the Z value of the exit surface of the f-θ lens 40, where the Z value is a parameter value of the shape of the f-θ lens, and the Z value refers to the shape sag (SAG) of the f-θ lens. According to the XYZ coordinate system shown in FIG. 3, the Z value shows the change along the Z-axis according to the position in the X-axis and Y-axis directions; the intersections between the primary optical axis and each of the incident surface and the exit surface of the f-θ lens may be configured as the origins of the Z values on the incident surface and the exit surface; the f-θ lens has an aspherical shape along the primary scanning direction, and d is the center thickness of the f-θ lens 40.

Exemplarily, a set of optical scanner 100 in normal use may be tested. The detailed parameters of the optical scanner 100 may be shown in Table 1.

TABLE 1

| Parameter name | Value |
|---|---|
| Maximum effective scanning angle $\theta_{max}$ (unit: °) | 104.16 |
| Effective scanning width W of the scanning target surface of the photosensitive drum (unit: mm) | 216 |
| Effective scanning width W' of f-θ lens (unit: mm) | 80 |
| f-θ coefficient K (unit: mm/rad) | 118.826 |
| Maximum incident angle $\varphi_{max}$ (unit: nm) | 36.84 |
| Laser wavelength λ (unit: nm) | 788 |
| The distance L1 from the incident surface of the f-θ lens to the deflection apparatus (unit: mm) | 21.9 |

TABLE 1-continued

| Parameter name | Value |
|---|---|
| f-θ lens thickness d (unit: mm) | 9.0 |
| The distance L2 from the exit surface of the f-θ lens to the surface of the photosensitive unit 210 (unit: mm) | 95.8 |
| Deflection angle of deflector (unit: °) | ±26 |

Within the range of the maximum effective scanning angle $\theta_{max}$, Table 2 may be obtained according to the measured values of SAG1 and SAG2 under the effective scanning widths of different f-θ lenses. Table 2 may show a list of the corresponding relationship between the effective scan width of the f-θ lens and SAG1 and SAG2 respectively, where the effective scanning widths W' of the f-θ lenses may be between −40 mm and 40 mm.

TABLE 2

| W'/2 (unit mm) | SAG1 | SAG2 |
|---|---|---|
| −40 | 3.579272 | 1.87122 |
| −39 | 3.824563 | 1.890123 |
| −38 | 4.019173 | 1.928452 |
| −37 | 4.1959 | 1.955564 |
| −36 | 4.347105 | 1.980564 |
| −35 | 4.52202 | 1.955156 |
| −34 | 4.660059 | 1.940465 |
| −33 | 4.772399 | 1.925564 |
| −32 | 4.867125 | 1.902412 |
| −31 | 4.943601 | 1.871564 |
| −30 | 5.003425 | 1.83126 |
| −29 | 5.045808 | 1.782123 |
| −28 | 5.093414 | 1.701311 |
| −27 | 5.11031 | 1.624645 |
| −26 | 5.097428 | 1.551156 |
| −25 | 5.054364 | 1.48131 |
| −24 | 4.995098 | 1.401315 |
| −23 | 4.899479 | 1.331654 |
| −22 | 4.768791 | 1.27154 |
| −21 | 4.632553 | 1.192135 |
| −20 | 4.468372 | 1.11672 |
| −19 | 4.270539 | 1.05212 |
| −18 | 4.057308 | 0.98145 |
| −17 | 3.811482 | 0.923555 |
| −16 | 3.561321 | 0.85213 |
| −15 | 3.304983 | 0.771321 |
| −14 | 3.01982 | 0.70645 |
| −13 | 2.724797 | 0.641645 |
| −12 | 2.415717 | 0.584648 |
| −11 | 2.100503 | 0.531564 |
| −10 | 1.784862 | 0.48123 |
| −9 | 1.506294 | 0.401212 |
| −8 | 1.21866 | 0.343217 |
| −7 | 0.953915 | 0.281312 |
| −6 | 0.710462 | 0.223464 |
| −5 | 0.492993 | 0.171516 |
| −4 | 0.307975 | 0.125464 |
| −3 | 0.162628 | 0.08415 |
| −2 | 0.056812 | 0.053 |
| −1 | −0.00232 | 0.029 |
| 1 | 0.002522 | 0.028156 |
| 2 | 0.064317 | 0.053465 |
| 3 | 0.174085 | 0.084564 |
| 4 | 0.323977 | 0.125135 |
| 5 | 0.512319 | 0.171535 |
| 6 | 0.732127 | 0.224655 |
| 7 | 0.979844 | 0.281565 |
| 8 | 1.249938 | 0.341235 |
| 9 | 1.538339 | 0.401345 |
| 10 | 1.819671 | 0.481232 |
| 11 | 2.134586 | 0.534655 |
| 12 | 2.458077 | 0.581547 |
| 13 | 2.766282 | 0.641215 |
| 14 | 3.064262 | 0.704565 |
| 15 | 3.34853 | 0.771535 |
| 16 | 3.606883 | 0.851235 |
| 17 | 3.855749 | 0.924565 |

TABLE 2-continued

| W'/2 (unit mm) | SAG1 | SAG2 |
|---|---|---|
| 18 | 4.103229 | 0.981123 |
| 19 | 4.312819 | 1.055468 |
| 20 | 4.515911 | 1.114565 |
| 21 | 4.678025 | 1.191535 |
| 22 | 4.809568 | 1.274864 |
| 23 | 4.93965 | 1.334565 |
| 24 | 5.033583 | 1.40465 |
| 25 | 5.092747 | 1.48327 |
| 26 | 5.130747 | 1.55647 |
| 27 | 5.146181 | 1.62549 |
| 28 | 5.124777 | 1.70454 |
| 29 | 5.077039 | 1.78316 |
| 30 | 5.029788 | 1.83465 |
| 31 | 4.969548 | 1.87265 |
| 32 | 4.891111 | 1.90255 |
| 33 | 4.794331 | 1.92465 |
| 34 | 4.675938 | 1.94231 |
| 35 | 4.536784 | 1.95462 |
| 36 | 4.356871 | 1.98132 |
| 37 | 4.203423 | 1.95464 |
| 38 | 4.021934 | 1.92814 |
| 39 | 3.820412 | 1.89231 |
| 40 | 3.572504 | 1.87135 |

TABLE 3 d (unit mm): 9

| W'/2 (unit mm) | (SAG1 + SAG2)/d | W'/2 (unit mm) | (SAG1 + SAG2)/d |
|---|---|---|---|
| −40 | 0.605610222 | 1 | 0.003408667 |
| −39 | 0.634965111 | 2 | 0.013086889 |
| −38 | 0.660847222 | 3 | 0.028738778 |
| −37 | 0.683496 | 4 | 0.049901333 |
| −36 | 0.703074333 | 5 | 0.075983667 |
| −35 | 0.719686222 | 6 | 0.106309111 |
| −34 | 0.733391556 | 7 | 0.140156444 |
| −33 | 0.744218111 | 8 | 0.176797 |
| −32 | 0.752170778 | 9 | 0.215520444 |
| −31 | 0.757240556 | 10 | 0.255655778 |
| −30 | 0.759409889 | 11 | 0.296582333 |
| −29 | 0.758659 | 12 | 0.337735889 |
| −28 | 0.754969444 | 13 | 0.378610778 |
| −27 | 0.748328333 | 14 | 0.418758556 |
| −26 | 0.738731556 | 15 | 0.457784889 |
| −25 | 0.726186 | 16 | 0.495346333 |
| −24 | 0.710712556 | 17 | 0.531145889 |
| −23 | 0.692348111 | 18 | 0.564928 |
| −22 | 0.671147889 | 19 | 0.596476333 |
| −21 | 0.647187556 | 20 | 0.625608444 |
| −20 | 0.620565778 | 21 | 0.652173333 |
| −19 | 0.591406556 | 22 | 0.676048 |
| −18 | 0.559862 | 23 | 0.697135 |
| −17 | 0.526115222 | 24 | 0.715359667 |
| −16 | 0.490383444 | 25 | 0.730668 |
| −15 | 0.452922667 | 26 | 0.743023889 |
| −14 | 0.41403 | 27 | 0.752407556 |
| −13 | 0.374049111 | 28 | 0.758812556 |
| −12 | 0.333373889 | 29 | 0.762243889 |
| −11 | 0.292451889 | 30 | 0.762714778 |
| −10 | 0.251788111 | 31 | 0.760243778 |
| −9 | 0.211945111 | 32 | 0.754851111 |
| −8 | 0.173541778 | 33 | 0.746553889 |
| −7 | 0.137247444 | 34 | 0.735361111 |
| −6 | 0.103769556 | 35 | 0.721267111 |
| −5 | 0.073834333 | 36 | 0.704243444 |
| −4 | 0.048159889 | 37 | 0.684229222 |
| −3 | 0.027419778 | 38 | 0.661118778 |
| −2 | 0.012201333 | 39 | 0.634747222 |
| −1 | 0.002964111 | 40 | 0.604872222 |
| 0 | 0 | / | / |

Figure 6:
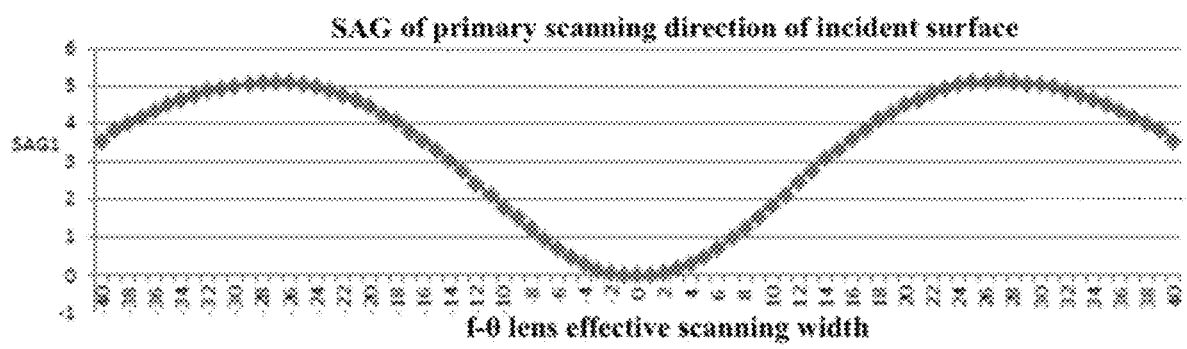
FIG. 6 illustrates a SAG value change curve of a primary scanning direction of an incident surface of an f-θ lens under an effective scanning width of the f-θ lens.
Figure 7:
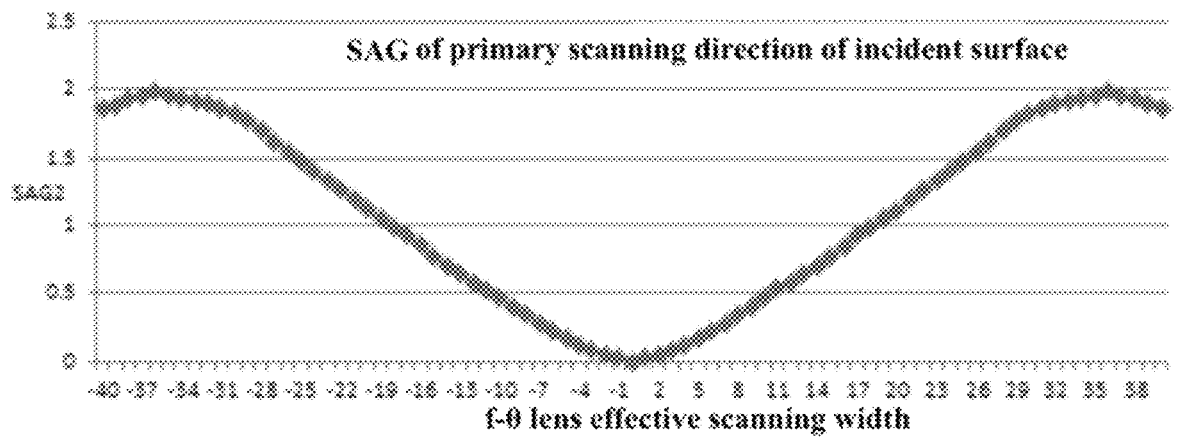
FIG. 7 illustrates a SAG value change curve of a primary scanning direction of an exit surface of an f-θ lens under an effective scanning width of the f-θ lens.

According to the corresponding relationship between the effective scanning widths W' of the f-θ lenses and the SAG1 and SAG2, the curve relationship diagrams shown in FIGS. 6 and 7 may be obtained. Table 3 may be obtained by combining the center thickness d value of the f-θ lens 40 in Table 1, the effective scanning widths W' of the f-θ lenses between −40 mm and 40 mm, the corresponding relationship between the effective scanning widths W' of the f-θ lenses and the ratio of the sum of SAG1 and SAG2 to the center thickness d of the f-θ lens 40.

Figure 8:
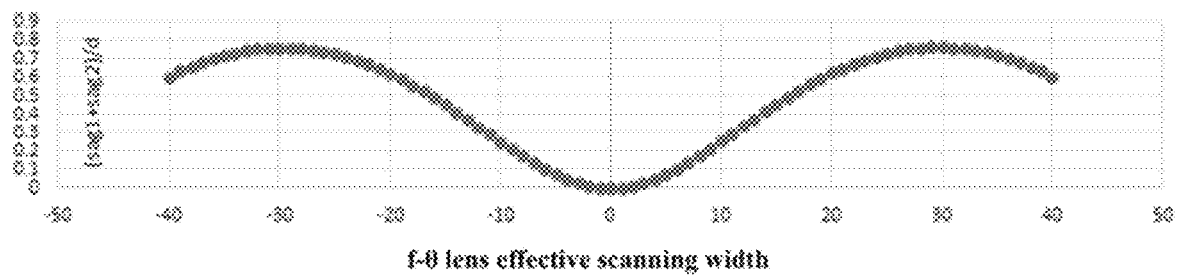
FIG. 8 illustrates a change curve of a ratio of a sum of an SAG value of an incident surface of an f-θ lens and an SAG value of an exit surface of the f-θ lens to a center thickness of the f-θ lens under an effective scanning width of the f-θ lens.

It can be seen from Table 3 that the ratio of the sum of the Z value SAG1 of the incident surface of the f-θ lens 40 and the Z value SAG2 of the exit surface of the f-θ lens 40 to the center thickness d of the f-θ lens 40 may satisfy the expressions (1) and (2). According to the above-mentioned example values shown in Table 2, as shown in FIG. 8, the relationship curve of a ratio of the sum of the SAG value of the incident surface of the f-θ lens 40 and the SAG value of the exit surface of the f-θ lens 40 to the center thickness of the f-θ lens 40 under different effective scanning widths W' of the f-θ lenses may be plotted.

The optical scanner 100 and the electrophotographic image forming apparatus provided by various embodiments of the present disclosure may include the light source 10 and the first optical unit 30, the deflection apparatus 20 and the f-θ lens 40 which are arranged sequentially along the primary optical axis direction of the light beam emitted from the light source 10. The f-θ lens 40 may be used to converge the light beam deflected by the deflection apparatus 20, such that the light beam may form images on the scanning target surface of the photosensitive unit 210. The ratio of the sum of the Z value of the incident surface and the Z value of the exit surface of the f-θ lens 40 to the center thickness d of the f-θ lens 40 may be between 0 and 1.0, which may reduce the probability that the trajectory of the light beam falls on the scanning target surface of the photosensitive unit 210 due to the improper shape design of the incident surface and the exit surface of the f-θ lens 40. The f-θ lens 40 may be set as a single piece, which may reduce the cost of the optical scanner, reduce the curvature sensitivity of the light beam scanning curve of the scanning target surface of the photosensitive unit 210 caused by the position error of the f-θ lens 40, improve the degree of freedom of optical design layout, reduce installation errors, and improve production efficiency.

Optionally, the magnification of the f-θ lens 40 in the secondary scanning direction is Ms_fθ, which may satisfy the following expression:

$$-2.44 \leq Ms\_f\theta \leq 2.44 \quad (3)$$

Specifically, in order to reduce the scanning deviation caused by the position error of the f-θ lens 40 which results in image forming defects, it is necessary to ensure that the position of the f-θ lens 40 is within the tolerance range which may not result in image forming defects. Therefore, the deviation of the image falling on the scanning target surface of the photosensitive drum when the position of the f-θ lens moves may be avoided, and the image forming design requirement may be satisfied. By setting the deflection position and the deflection angle of the light beam after the light beam of the deflection apparatus 20 enters the f-θ lens 40, the product specifications may be satisfied within the allowable error range of machine manufacturing and without greatly increasing the manufacturing cost.

Figure 9:
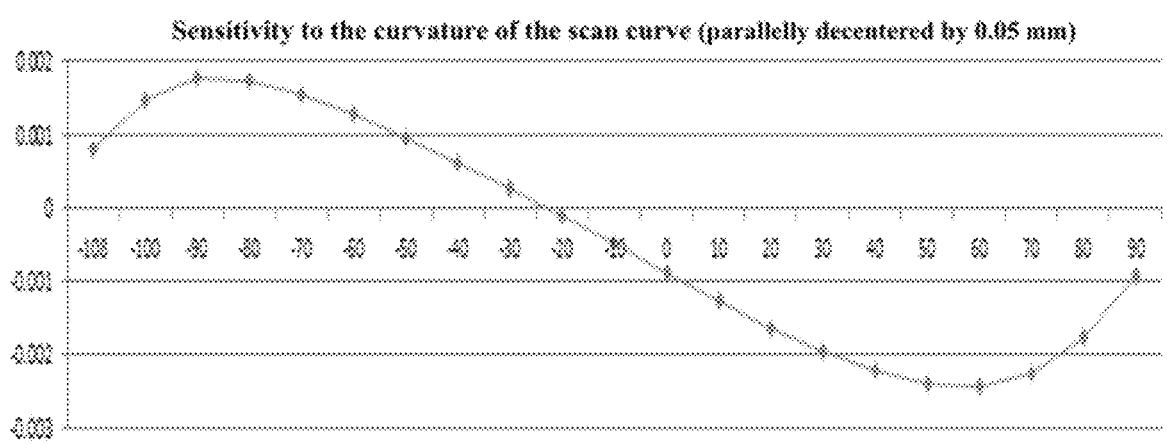
FIG. 9 illustrates a change curve of design values and deviation values of an f-θ lens when a light beam entering the f-θ lens is parallelly decentered by 0.05 mm.
Figure 10:
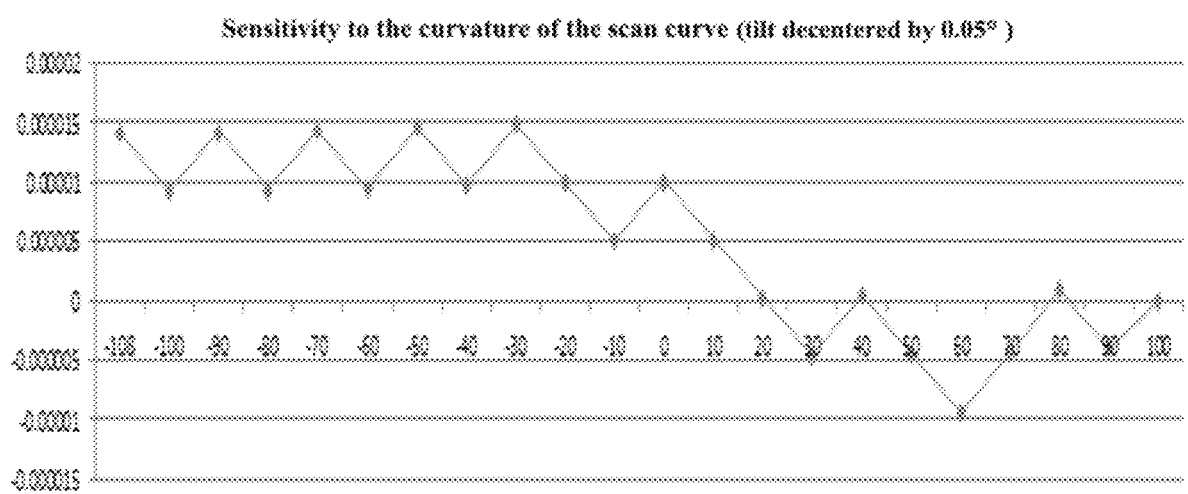
FIG. 10 illustrates a change curve of design values and deviation values of an f-θ lens when a light beam entering the f-θ lens is tilted by 0.05°.

Along the scanning direction, the manufacturing accuracy of the f-θ lens 40 or the positioning error of the f-θ lens 40 may result in the deviation of the light beam relative to the incident center of the optical axis during the transmission process, or the manufacturing error of the deflector and the operation shaking of the deflector may also result in the deviation of the light beam relative to the incident center of the optical axis during the transmission process. The relationship change curves between the design value sand the actual deviation values of the beam scanning curves when the beam entering the f-θ lens 40 is parallelly decentered by 0.05 mm and the beam entering the f-θ lens is tilted by 0.05° may be respectively shown in FIGS. 9-10.

Optionally, the light source 10 includes the first light-emitting point and the second light-emitting point; and the f-θ lens 40 may satisfy the following expressions in the primary scanning direction:

$$SAG1\text{-}0>0, SAG2\text{-}1>0, SAG1\text{-}2>0, SAG2\text{-}2>0 \quad (4)$$

$$0<(SAG1\text{-}1+SAG2\text{-}1)/d<0.8 \quad (5)$$

$$0<(SAG1\text{-}2+SAG2\text{-}2)/d<0.8 \quad (6)$$

where SAG1-1 is the Z value at the intersection of the light beam of the first light-emitting point and the incident surface of the f-θ lens 40; SAG2-1 is the Z value at the intersection of the light beam of the first light-emitting point and the exit surface of the f-θ lens 40; SAG1-2 is the Z value at the intersection of the light beam of the second light-emitting point and the incident surface of the f-θ lens 40; SAG2-2 is the Z value at the intersection of the light beam of the second light-emitting point and the exit surface of the f-θ lens 40; and d is the center thickness of the f-θ lens 40.

The primary scanning direction surface is the X-Z plane, and the secondary scanning direction surface is the Y-Z plane, which may be included in the XYZ coordinate system. The position error of the deflection apparatus 20 may result in the light beam entering the f-θ lens 40 to have respective deviation values corresponding to the X direction, the Y direction and the Z direction in the XYZ coordinate system, such that the optical scanner that may satisfy the deviation range may be designed. Exemplarily, along the secondary scanning direction, when the incident light beam enters the incident surface of the f-θ lens 40, the positioning error of the f-θ lens 40, or the manufacturing error of the deflection apparatus 20, or the shaking during the operation of the deflection apparatus 20 may result in the deviation of the light beam relative to the incident center of the optical axis during the transmission process. The deviation distances of the light beams emitted from the first light-emitting point and the second light-emitting point relative to the incident center of the optical axis may be set to ±0.05 mm or ±0.1 mm, and corresponding light beam deviations in each direction may be tested, where the measured specific data of the deviation distances corresponding to the light beams in the Y, X, and Z directions may be shown in Table 4.

TABLE 4

| Scanning angle | Scanning position | Design | decenter Y | | | | decenter X | |
|---|---|---|---|---|---|---|---|---|
| | | | −0.100 mm | −0.050 mm | +0.050 mm | +0.100 mm | −0.100 mm | −0.050 mm |
| 26.03782 | −107.908 | −1.08404 | −1.56785 | −1.32296 | −0.82904 | −0.58031 | −1.18022 | −1.11585 |
| 24.10909 | −99.9059 | −1.3975 | −1.95668 | −1.67607 | −1.12522 | −0.89152 | −1.47629 | −1.41995 |
| 21.69818 | −89.8962 | −1.54575 | −2.02305 | −1.823 | −1.27199 | −1.03241 | −1.62843 | −1.56826 |
| 19.28727 | −79.9068 | −1.66751 | −2.09624 | −1.89788 | −1.39175 | −1.13824 | −1.77757 | −1.69616 |
| 16.87636 | −69.9089 | −1.71563 | −2.1401 | −1.92436 | −1.46488 | −1.22402 | −1.85421 | −1.7509 |
| 14.46545 | −59.8887 | −1.41612 | −1.87257 | −1.64366 | −1.18027 | −0.94741 | −1.62889 | −1.4624 |
| 12.05455 | −49.8587 | −1.29311 | −1.76819 | −1.52029 | −1.02505 | −0.76089 | −1.54764 | −1.35708 |
| 9.643636 | −39.8366 | −1.4967 | −2.01814 | −1.73414 | −1.27492 | −0.98066 | −1.80771 | −1.5535 |
| 7.232727 | −29.8326 | −1.67909 | −2.22799 | −1.95565 | −1.48718 | −1.3128 | −2.09224 | −1.79337 |
| 4.821818 | −19.847 | −1.63437 | −2.01101 | −1.79472 | −1.48651 | −1.3428 | −2.08857 | −1.7194 |
| 2.410909 | −9.8734 | −1.43586 | −1.58382 | −1.5103 | −1.36042 | −1.2867 | −1.84446 | −1.53047 |
| 0 | 0.0965 | −1.37693 | −1.34738 | −1.36293 | −1.38943 | −1.4004 | −1.78577 | −1.47438 |
| −2.41091 | 10.0708 | −1.58291 | −1.38294 | −1.48258 | −1.68307 | −1.78198 | −2.07246 | −1.68091 |
| −4.82182 | 20.0563 | −1.88107 | −1.49121 | −1.65647 | −2.11609 | −2.33972 | −2.35595 | −2.01137 |
| −7.23273 | 30.0572 | −1.86447 | −1.40824 | −1.5849 | −2.14074 | −2.42271 | −2.25895 | −1.9699 |
| −9.64364 | 40.073 | −1.49443 | −0.95423 | −1.23846 | −1.73508 | −2.01908 | −1.83349 | −1.56861 |
| −12.0545 | 50.0957 | −1.20882 | −0.70105 | −0.95292 | −1.46551 | −1.67245 | −1.49546 | −1.27901 |
| −14.4655 | 60.1099 | −1.44761 | −1.0141 | −1.23048 | −1.6455 | −1.85448 | −1.66067 | −1.49934 |
| −16.8764 | 70.1008 | −1.85546 | −1.43533 | −1.66771 | −2.05231 | −2.24901 | −1.99998 | −1.89232 |
| −19.2873 | 80.0707 | −1.88798 | −1.43087 | −1.68578 | −2.07299 | −2.26115 | −1.9858 | −1.91307 |
| −21.6982 | 90.0518 | −1.67567 | −1.15779 | −1.41375 | −1.91092 | −2.08605 | −1.75675 | −1.69753 |
| −24.1091 | 100.0761 | −1.22365 | −0.77835 | −1.00208 | −1.486 | −1.75484 | −1.32107 | −1.24915 |
| −26.0378 | 108.0956 | −1.40595 | −0.97937 | −1.16839 | −1.63889 | −1.88229 | −1.46545 | −1.42185 |

| Scanning angle | Scanning position | decenter X | | decenter Z | | | |
|---|---|---|---|---|---|---|---|
| | | +0.050 mm | +0.100 mm | −0.100 mm | −0.050 mm | +0.050 mm | +0.100 mm |
| 26.03782 | −107.908 | −1.11585 | −1.18022 | −1.01024 | −1.04698 | −1.12235 | −1.16037 |
| 24.10909 | −99.9059 | −1.41995 | −1.47629 | −1.28783 | −1.343 | −1.45092 | −1.50344 |
| 21.69818 | −89.8962 | −1.56826 | −1.62843 | −1.32586 | −1.43548 | −1.65698 | −1.76738 |
| 19.28727 | −79.9068 | −1.69616 | −1.77757 | −1.37894 | −1.52276 | −1.80278 | −1.90244 |
| 16.87636 | −69.9089 | −1.7509 | −1.85421 | −1.39544 | −1.56941 | −1.84246 | −1.9735 |
| 14.46545 | −59.8887 | −1.4624 | −1.62889 | −1.11162 | −1.26363 | −1.56214 | −1.70218 |
| 12.05455 | −49.8587 | −1.35708 | −1.54764 | −0.97152 | −1.13063 | −1.45009 | −1.54977 |
| 9.643636 | −39.8366 | −1.5535 | −1.80771 | −1.19732 | −1.38257 | −1.61811 | −1.79753 |
| 7.232727 | −29.8326 | −1.79337 | −2.09224 | −1.38291 | −1.52739 | −1.89495 | −2.10304 |
| 4.821818 | −19.847 | −1.7194 | −2.08857 | −1.275 | −1.45132 | −1.84328 | −2.11715 |
| 2.410909 | −9.8734 | −1.53047 | −1.84446 | −0.96472 | −1.23018 | −1.64256 | −1.8674 |
| 0 | 0.0965 | −1.47438 | −1.78577 | −0.86821 | −1.16365 | −1.59034 | −1.80289 |
| −2.41091 | 10.0708 | −1.68091 | −2.07246 | −1.18885 | −1.38211 | −1.78575 | −2.08389 |
| −4.82182 | 20.0563 | −2.01137 | −2.35595 | −1.4818 | −1.65364 | −2.11978 | −2.3487 |
| −7.23273 | 30.0572 | −1.9699 | −2.25895 | −1.51838 | −1.66697 | −2.05044 | −2.23608 |

TABLE 4-continued

| | | | | | | | |
|---|---|---|---|---|---|---|---|
| −9.64364 | 40.073 | −1.56861 | −1.83349 | −1.19532 | −1.37099 | −1.61708 | −1.76731 |
| −12.0545 | 50.0957 | −1.27901 | −1.49546 | −0.89264 | −1.05044 | −1.36734 | −1.49851 |
| −14.4655 | 60.1099 | −1.49934 | −1.66067 | −1.12365 | −1.28579 | −1.5908 | −1.73843 |
| −16.8764 | 70.1008 | −1.89232 | −1.99998 | −1.55025 | −1.71186 | −2.00458 | −2.156 |
| −19.2873 | 80.0707 | −1.91307 | −1.9858 | −1.59662 | −1.7674 | −2.00971 | −2.13454 |
| −21.6982 | 90.0518 | −1.69753 | −1.75675 | −1.40303 | −1.53914 | −1.81337 | −1.91439 |
| −24.1091 | 100.0761 | −1.24915 | −1.32107 | −1.0539 | −1.13683 | −1.31082 | −1.39801 |
| −26.0378 | 108.0956 | −1.42185 | −1.46545 | −1.24695 | −1.32821 | −1.48321 | −1.55994 |

Figure 11:
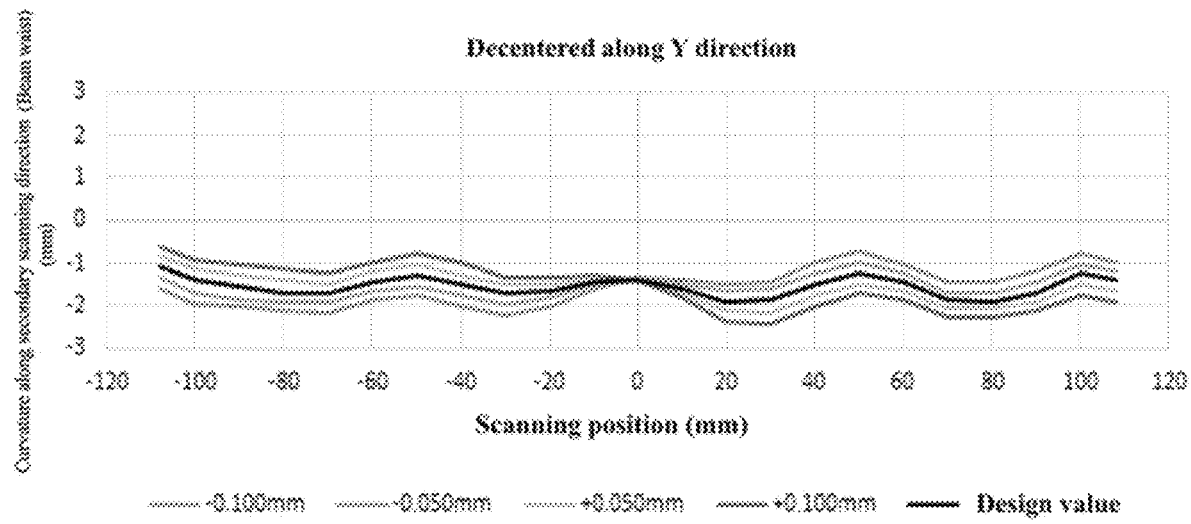
FIG. 11 illustrates a deviation data curve corresponding to light beam deviation magnitudes along a Y direction.
Figure 12:
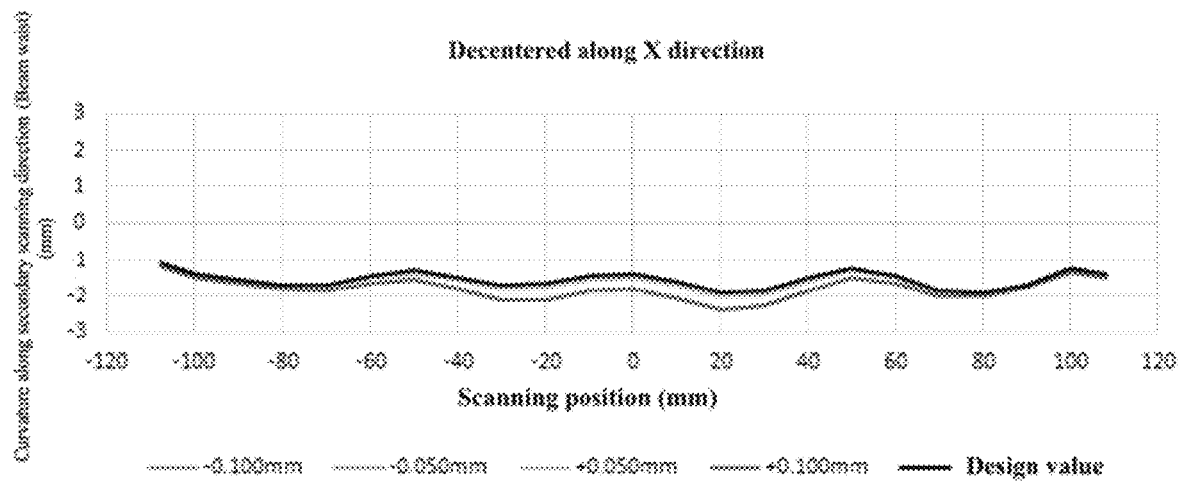
FIG. 12 illustrates a deviation data curve corresponding to light beam deviation magnitudes along an X direction.
Figure 13:
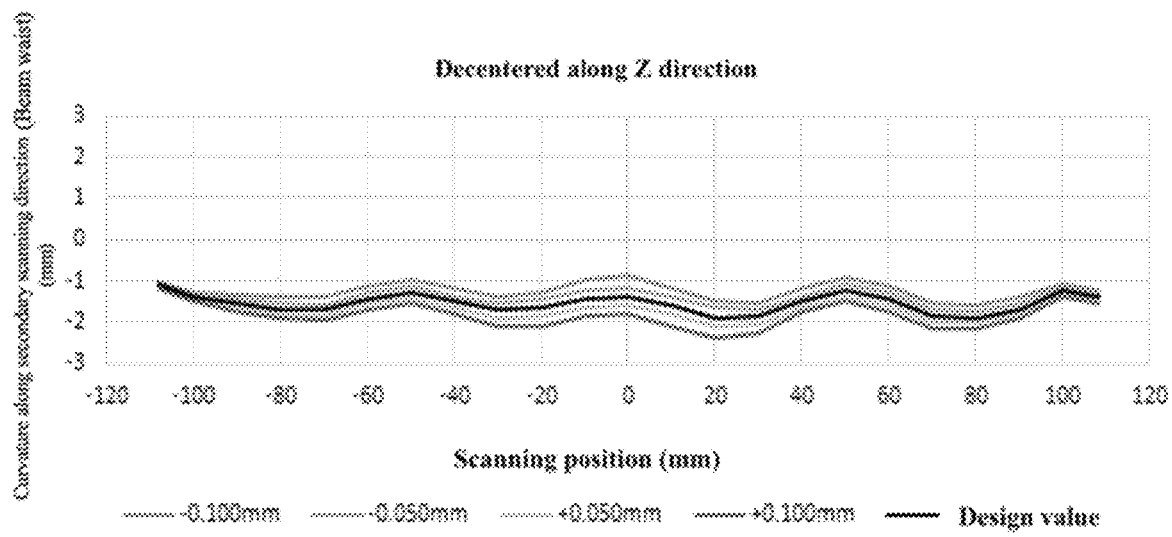
FIG. 13 illustrates a deviation data curve corresponding to light beam deviation magnitudes along a Z direction.

Based on Table 4, FIG. 11 illustrates a deviation data curve corresponding to light beam deviation magnitudes along a Y direction; FIG. 12 illustrates a deviation data curve corresponding to light beam deviation magnitudes along a Y direction; and FIG. 13 illustrates a deviation data curve corresponding to light beam deviation magnitudes along a Y direction. It can be seen from the above data curves that, when the above-mentioned expressions are satisfied, the light beam deviation magnitudes along the Y direction, the light beam deviation magnitudes along the X direction, and the light beam deviation magnitudes along the Z direction which are deviated from the design value may be relatively small, and the design specifications for the optical scanning device (unit) may be satisfied.

Figure 14:
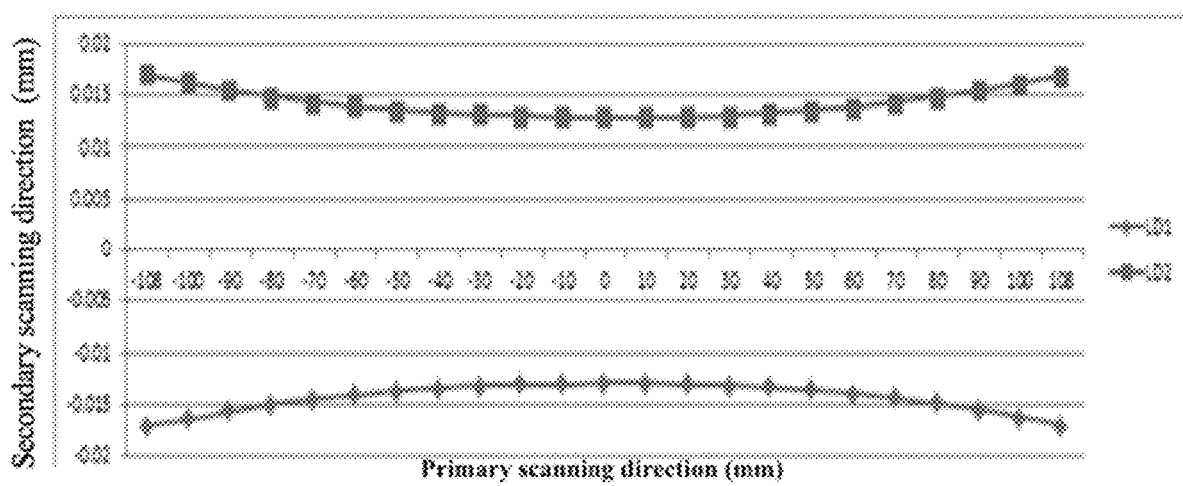
FIG. 14 illustrates a light beam trajectory schematic when two light beams pass through a deflection apparatus to an incident surface of an f-θ lens.
Figure 15:
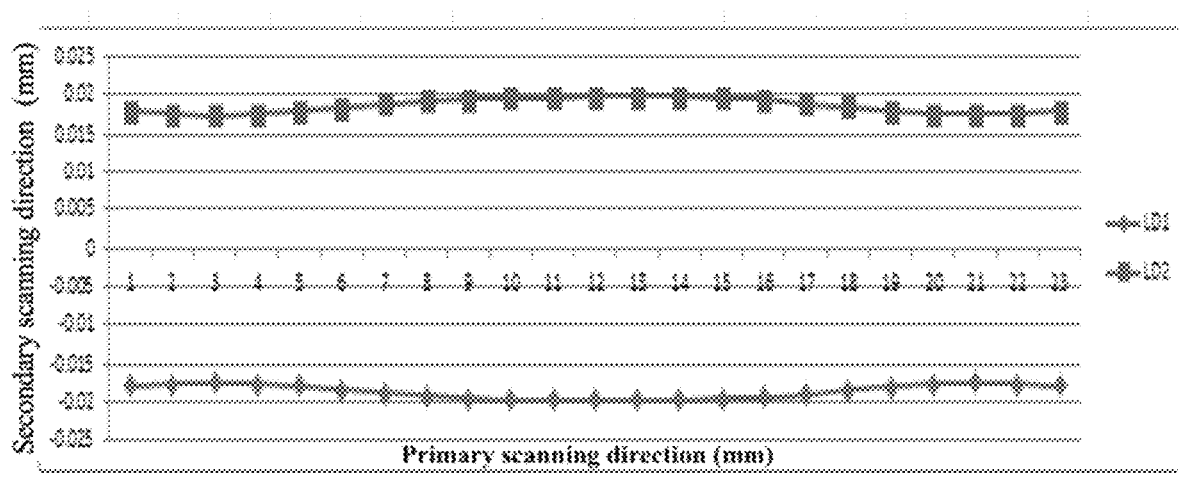
FIG. 15 illustrates a light beam trajectory schematic when two light beams pass through a deflection apparatus to an exit surface of an f-θ lens.

FIGS. 14-15 may be trajectory schematics when two light beams of the first and second light-emitting points pass through the deflection apparatus to the incident surface and the exit surface of the f-θ lens, respectively. When the first light-emitting point and the second light-emitting point are used as the light source 10, the first light-emitting point and the second light-emitting point may be arranged side by side and emit light in sequence, and the light beam emitted by the first light-emitting point and the light beam emitted by the second light-emitting point may the respectively pass the f-θ lens 40. Within the range of the maximum effective scanning angle $\theta_{max}$, Table 5 may be obtained according to the values of SAG1-1 under the measured effective scanning widths W' of different f-θ lenses. Table 5 shows the measured values of SAG1-1 when the effective scanning widths W' of the f-θ lenses is between −40 mm and 40 mm.

Similarly, in the range of the maximum effective scanning angle $\theta_{max}$, Table 6 may be obtained according to the values of SAG1-2 under the measured effective scanning widths W' of different f-θ lenses. Table 6 shows the measured values of SAG1-2 when the effective scanning widths W' of the f-θ lenses is between −40 mm and 40 mm.

TABLE 5

| W'/2 (unit mm) | SAG1-1 |
|---|---|
| −40 | 3.466822 |
| −39 | 3.712113 |
| −38 | 3.906723 |
| −37 | 4.08345 |
| −36 | 4.234655 |
| −35 | 4.409569544 |
| −34 | 4.5476086 |
| −33 | 4.659949 |
| −32 | 4.754674685 |
| −31 | 4.831151 |
| −30 | 4.890975 |
| −29 | 4.93335785 |
| −28 | 4.98096377 |
| −27 | 4.99786 |
| −26 | 4.9849776 |
| −25 | 4.941914 |
| −24 | 4.882648 |
| −23 | 4.787029 |

TABLE 5-continued

| W'/2 (unit mm) | SAG1-1 |
|---|---|
| −22 | 4.656341 |
| −21 | 4.5201026 |
| −20 | 4.355922 |
| −19 | 4.158089 |
| −18 | 3.944858 |
| −17 | 3.699032 |
| −16 | 3.448871 |
| −15 | 3.192533 |
| −14 | 2.90737 |
| −13 | 2.612347 |
| −12 | 2.303267 |
| −11 | 1.988053 |
| −10 | 1.672412 |
| −9 | 1.393844 |
| −8 | 1.1062095 |
| −7 | 0.841465 |
| −6 | 0.598012 |
| −5 | 0.380543 |
| −4 | 0.195525 |
| −3 | 0.050178 |
| −2 | 0.004362 |
| −1 | 0.0072516 |
| 0 | 0 |
| 1 | 0.00252165 |
| 2 | 0.0643172 |
| 3 | 0.061635 |
| 4 | 0.21152654 |
| 5 | 0.3998685 |
| 6 | 0.61967732 |
| 7 | 0.8673935 |
| 8 | 1.1374876 |
| 9 | 1.4258887 |
| 10 | 1.7072205 |
| 11 | 2.0221364 |
| 12 | 2.3456265 |
| 13 | 2.653832 |
| 14 | 2.9518124 |
| 15 | 3.2360795 |
| 16 | 3.4944325 |
| 17 | 3.7432985 |
| 18 | 3.99077885 |
| 19 | 4.200369 |
| 20 | 4.4034612 |
| 21 | 4.5655754 |
| 22 | 4.697118 |
| 23 | 4.8272002 |
| 24 | 4.921133 |
| 25 | 4.980297 |
| 26 | 5.018297 |
| 27 | 5.03373113 |
| 28 | 5.012327 |
| 29 | 4.9645886 |
| 30 | 4.917338 |
| 31 | 4.857098 |
| 32 | 4.77866136 |
| 33 | 4.681881 |
| 34 | 4.563488 |
| 35 | 4.424334 |
| 36 | 4.244421 |

TABLE 5-continued

| W'/2 (unit mm) | SAG1-1 |
| --- | --- |
| 37 | 4.090973 |
| 38 | 3.9094836 |
| 39 | 3.7079615 |
| 40 | 3.4600544 |
| / | / |

TABLE 6

| W'/2 (unit mm) | SAG1-2 |
| --- | --- |
| −40 | 3.669272 |
| −39 | 3.914563 |
| −38 | 4.109173 |
| −37 | 4.2859 |
| −36 | 4.437105 |
| −35 | 4.612019544 |
| −34 | 4.7500586 |
| −33 | 4.862399 |
| −32 | 4.957124685 |
| −31 | 5.033601 |
| −30 | 5.093425 |
| −29 | 5.13580785 |
| −28 | 5.18341377 |
| −27 | 5.20031 |
| −26 | 5.1874276 |
| −25 | 5.144364 |
| −24 | 5.085098 |
| −23 | 4.989479 |
| −22 | 4.858791 |
| −21 | 4.7225526 |
| −20 | 4.558372 |
| −19 | 4.360539 |
| −18 | 4.147308 |
| −17 | 3.901482 |
| −16 | 3.651321 |
| −15 | 3.394983 |
| −14 | 3.10982 |
| −13 | 2.814797 |
| −12 | 2.505717 |
| −11 | 2.190503 |
| −10 | 1.874862 |
| −9 | 1.596294 |
| −8 | 1.3086595 |
| −7 | 1.043915 |
| −6 | 0.800462 |
| −5 | 0.582993 |
| −4 | 0.397975 |
| −3 | 0.252628 |
| −2 | 0.146812 |
| −1 | 0.0972516 |
| 0 | 0 |
| 1 | 0.09252165 |
| 2 | 0.1543172 |
| 3 | 0.264085 |
| 4 | 0.41397654 |
| 5 | 0.6023185 |
| 6 | 0.82212732 |
| 7 | 1.0698435 |
| 8 | 1.3399376 |
| 9 | 1.6283387 |
| 10 | 1.9096705 |
| 11 | 2.2245864 |
| 12 | 2.5480765 |
| 13 | 2.856282 |
| 14 | 3.1542624 |
| 15 | 3.4385295 |
| 16 | 3.6968825 |
| 17 | 3.9457485 |
| 18 | 4.19322885 |
| 19 | 4.402819 |
| 20 | 4.6059112 |
| 21 | 4.7680254 |
| 22 | 4.899568 |
| 23 | 5.0296502 |
| 24 | 5.123583 |

TABLE 6-continued

| W'/2 (unit mm) | SAG1-2 |
| --- | --- |
| 25 | 5.182747 |
| 26 | 5.220747 |
| 27 | 5.23618113 |
| 28 | 5.214777 |
| 29 | 5.1670386 |
| 30 | 5.119788 |
| 31 | 5.059548 |
| 32 | 4.98111136 |
| 33 | 4.884331 |
| 34 | 4.765938 |
| 35 | 4.626784 |
| 36 | 4.446871 |
| 37 | 4.293423 |
| 38 | 4.1119336 |
| 39 | 3.9104115 |
| 40 | 3.6625044 |
| / | / |

Similarly, in the range of the maximum effective scanning angle $\theta_{max}$, Table 7 may be obtained according to the value of SAG2-1 under the measured effective scanning widths W' of different f-θ lenses. Table 7 shows the measured SAG2-1 value when the effective scanning widths W' of the f-θ lenses is between −40 mm and 40 mm.

Similarly, in the range of the maximum effective scanning angle $\theta_{max}$, Table 8 may be obtained according to the value of SAG2-2 under the measured effective scanning widths W' of different f-θ lenses. Table 8 shows the measured value of SAG2-2 when the effective scanning widths W' of the f-θ lenses is between −40 mm and 40 mm.

At the same scanning width W' of the f-θ lens, it can be seen from Table 1 that the center thickness d of the f-θ lens 40 is about 9 mm. Table 9 may be obtained according to the ratio of the sum of SAG1-1 and SAG2-1 to the center thickness d of the f-θ lens 40, and the ratio of the sum of SAG1-2 and SAG2-2 to the center thickness d of the f-θ lens 40.

It can be seen from Table 9, after the light beam emitted by the first light-emitting point is deflected by the deflection apparatus 20, the ratio of the sum of the Z value SAG1-1 at the intersection of the light beam and the incident surface of the f-θ lens 40 and the Z value SAG1-2 at the intersection of the light beam and the exit surface of the f-θ lens 40 to the center thickness d of the f-θ lens 40 may satisfy expression (5) and express (6). Similarly, after the light beam emitted by the second light-emitting point is deflected by the deflection apparatus 20, the ratio of the sum of the Z value at the intersection of the light beam and the incident surface of the f-θ lens 40 SAG1-1 and the Z value at the intersection of the light beam and the exit surface of the f-θ lens 40 SAG1-2 to the center thickness d of the f-θ lens 40 may satisfy expression (5) and expression (6).

TABLE 7

| W'/2 (unit mm) | SAG2-1 |
| --- | --- |
| −40 | 1.93122 |
| −39 | 1.950123 |
| −38 | 1.988452 |
| −37 | 2.015564 |
| −36 | 2.040564 |
| −35 | 2.015156456 |
| −34 | 2.0004654 |
| −33 | 1.985564 |
| −32 | 1.962412315 |
| −31 | 1.931564 |
| −30 | 1.891264 |

TABLE 7-continued

| W'/2 (unit mm) | SAG2-1 |
|---|---|
| −29 | 1.84212315 |
| −28 | 1.76131123 |
| −27 | 1.684645 |
| −26 | 1.6111564 |
| −25 | 1.54131 |
| −24 | 1.461315 |
| −23 | 1.391654 |
| −22 | 1.33154 |
| −21 | 1.2521354 |
| −20 | 1.17672 |
| −19 | 1.11212 |
| −18 | 1.04145 |
| −17 | 0.983555 |
| −16 | 0.91213 |
| −15 | 0.831321 |
| −14 | 0.76645 |
| −13 | 0.701645 |
| −12 | 0.644648 |
| −11 | 0.591564 |
| −10 | 0.541231 |
| −9 | 0.461212 |
| −8 | 0.4032165 |
| −7 | 0.341312 |
| −6 | 0.283464 |
| −5 | 0.231516 |
| −4 | 0.185464 |
| −3 | 0.14415 |
| −2 | 0.113 |
| −1 | 0.0794254 |
| 0 | 0 |
| 1 | 0.08815635 |
| 2 | 0.1134648 |
| 3 | 0.144564 |
| 4 | 0.18513546 |
| 5 | 0.2315345 |
| 6 | 0.28465468 |
| 7 | 0.3415645 |
| 8 | 0.4012354 |
| 9 | 0.4613453 |
| 10 | 0.5412315 |
| 11 | 0.5946546 |
| 12 | 0.6415465 |
| 13 | 0.701215 |
| 14 | 0.7645646 |
| 15 | 0.8315345 |
| 16 | 0.9112345 |
| 17 | 0.9845645 |
| 18 | 1.04112315 |
| 19 | 1.115468 |
| 20 | 1.1745648 |
| 21 | 1.2515346 |
| 22 | 1.334864 |
| 23 | 1.3945648 |
| 24 | 1.464654 |
| 25 | 1.543265 |
| 26 | 1.616468 |
| 27 | 1.68548687 |
| 28 | 1.764536 |
| 29 | 1.8431564 |
| 30 | 1.894645 |
| 31 | 1.932646 |
| 32 | 1.96254864 |
| 33 | 1.984654 |
| 34 | 2.002312 |
| 35 | 2.01462 |
| 36 | 2.04132 |
| 37 | 2.01464 |
| 38 | 1.9881354 |
| 39 | 1.9523135 |
| 40 | 1.9313456 |
| / | / |

TABLE 8

| W'/2 (unit mm) | SAG2-2 |
|---|---|
| −40 | 1.89122 |
| −39 | 1.910123 |
| −38 | 1.948452 |
| −37 | 1.975564 |
| −36 | 2.000564 |
| −35 | 1.975156456 |
| −34 | 1.9604654 |
| −33 | 1.945564 |
| −32 | 1.922412315 |
| −31 | 1.891564 |
| −30 | 1.851264 |
| −29 | 1.80212315 |
| −28 | 1.72131123 |
| −27 | 1.644645 |
| −26 | 1.5711564 |
| −25 | 1.50131 |
| −24 | 1.421315 |
| −23 | 1.351654 |
| −22 | 1.29154 |
| −21 | 1.2121354 |
| −20 | 1.13672 |
| −19 | 1.07212 |
| −18 | 1.00145 |
| −17 | 0.943555 |
| −16 | 0.87213 |
| −15 | 0.791321 |
| −14 | 0.72645 |
| −13 | 0.661645 |
| −12 | 0.604648 |
| −11 | 0.551564 |
| −10 | 0.501231 |
| −9 | 0.421212 |
| −8 | 0.3632165 |
| −7 | 0.301312 |
| −6 | 0.243464 |
| −5 | 0.191516 |
| −4 | 0.145464 |
| −3 | 0.10415 |
| −2 | 0.073 |
| −1 | 0.0394254 |
| 0 | 0 |
| 1 | 0.04815635 |
| 2 | 0.0734648 |
| 3 | 0.104564 |
| 4 | 0.14513546 |
| 5 | 0.1915345 |
| 6 | 0.24465468 |
| 7 | 0.3015645 |
| 8 | 0.3612354 |
| 9 | 0.4213453 |
| 10 | 0.5012315 |
| 11 | 0.5546546 |
| 12 | 0.6015465 |
| 13 | 0.661215 |
| 14 | 0.7245646 |
| 15 | 0.7915345 |
| 16 | 0.8712345 |
| 17 | 0.9445645 |
| 18 | 1.00112315 |
| 19 | 1.075468 |
| 20 | 1.1345648 |
| 21 | 1.2115346 |
| 22 | 1.294864 |
| 23 | 1.3545648 |
| 24 | 1.424654 |
| 25 | 1.503265 |
| 26 | 1.576468 |
| 27 | 1.64548687 |
| 28 | 1.724536 |
| 29 | 1.8031564 |
| 30 | 1.854645 |
| 31 | 1.892646 |
| 32 | 1.92254864 |
| 33 | 1.944654 |
| 34 | 1.962312 |
| 35 | 1.97462 |
| 36 | 2.00132 |
| 37 | 1.97464 |

TABLE 8-continued

| W'/2 (unit mm) | SAG2-2 |
|---|---|
| 38 | 1.9481354 |
| 39 | 1.9123135 |
| 40 | 1.8913456 |
| / | / |

TABLE 9

| d (unit mm) | 9 | | |
|---|---|---|---|
| W'/2 (unit mm) | (SAG1-2 + SAG2-2)/d | W'/2 (unit mm) | (SAG1-2 + SAG2-2)/d |
| −40 | 0.617832444 | 1 | 0.015630889 |
| −39 | 0.647187333 | 2 | 0.025309111 |
| −38 | 0.673069444 | 3 | 0.040961 |
| −37 | 0.695718222 | 4 | 0.062123556 |
| −36 | 0.715296556 | 5 | 0.088205889 |
| −35 | 0.731908444 | 6 | 0.118531333 |
| −34 | 0.745613778 | 7 | 0.152378667 |
| −33 | 0.756440333 | 8 | 0.189019222 |
| −32 | 0.764393 | 9 | 0.227742667 |
| −31 | 0.769462778 | 10 | 0.267878 |
| −30 | 0.771632111 | 11 | 0.308804556 |
| −29 | 0.770881222 | 12 | 0.349958111 |
| −28 | 0.767191667 | 13 | 0.390833 |
| −27 | 0.760550556 | 14 | 0.430980778 |
| −26 | 0.750953778 | 15 | 0.470007111 |
| −25 | 0.738408222 | 16 | 0.507568556 |
| −24 | 0.722934778 | 17 | 0.543368111 |
| −23 | 0.704570333 | 18 | 0.577150222 |
| −22 | 0.683370111 | 19 | 0.608698556 |
| −21 | 0.659409778 | 20 | 0.637830667 |
| −20 | 0.632788 | 21 | 0.664395556 |
| −19 | 0.603628778 | 22 | 0.688270222 |
| −18 | 0.572084222 | 23 | 0.709357222 |
| −17 | 0.538337444 | 24 | 0.727581889 |
| −16 | 0.502605667 | 25 | 0.742890222 |
| −15 | 0.465144889 | 26 | 0.755246111 |
| −14 | 0.426252222 | 27 | 0.764629778 |
| −13 | 0.386271333 | 28 | 0.771034778 |
| −12 | 0.345596111 | 29 | 0.774466111 |
| −11 | 0.304674111 | 30 | 0.774937 |
| −10 | 0.264010333 | 31 | 0.772466 |
| −9 | 0.224167333 | 32 | 0.767073333 |
| −8 | 0.185764 | 33 | 0.758776111 |
| −7 | 0.149469667 | 34 | 0.747583333 |
| −6 | 0.115991778 | 35 | 0.733489333 |
| −5 | 0.086056556 | 36 | 0.716465667 |
| −4 | 0.060382111 | 37 | 0.6964514844 |
| −3 | 0.039642 | 38 | 0.673341 |

TABLE 9-continued

| d (unit mm) | 9 | | |
|---|---|---|---|
| W'/2 (unit mm) | (SAG1-2 + SAG2-2)/d | W'/2 (unit mm) | (SAG1-2 + SAG2-2)/d |
| −2 | 0.024423556 | 39 | 0.6469694844 |
| −1 | 0.015186333 | 40 | 0.6170944854 |
| 0 | 0 | / | / |

The deviation distances of the light beams emitted from the first light-emitting point and the second light-emitting point relative to the incident center of the optical axis may be set to ±0.05 mm or ±0.1 mm, and corresponding light beam deviations in each direction may be tested, where the measured specific data of the deviation distances corresponding to the light beams in the Y, X, and Z directions may be shown in Table 4.

The primary scanning direction surface is the X-Z plane, and the secondary scanning direction surface is the Y-Z plane, which may be included in the XYZ coordinate system. Exemplarily, along the primary scanning direction, when the incident light beam enters the incident surface of the f-θ lens 40, the positioning error of the f-θ lens 40, or the manufacturing error of the deflection apparatus 20, or the shaking during the operation of the deflection apparatus 20 may result in the deviation of the light beam relative to the incident center of the optical axis during the transmission process. The tilt angles of the light beams emitted from the first light-emitting point and the second light-emitting point with respect to the incident center of the optical axis may be set to ±0.05° or ±0.1°, and corresponding light beam deviations in each direction may be tested, where the specific data of the tilt angles of the light beam in the X, Y and Z directions may be shown in Table 10.

Figure 16:
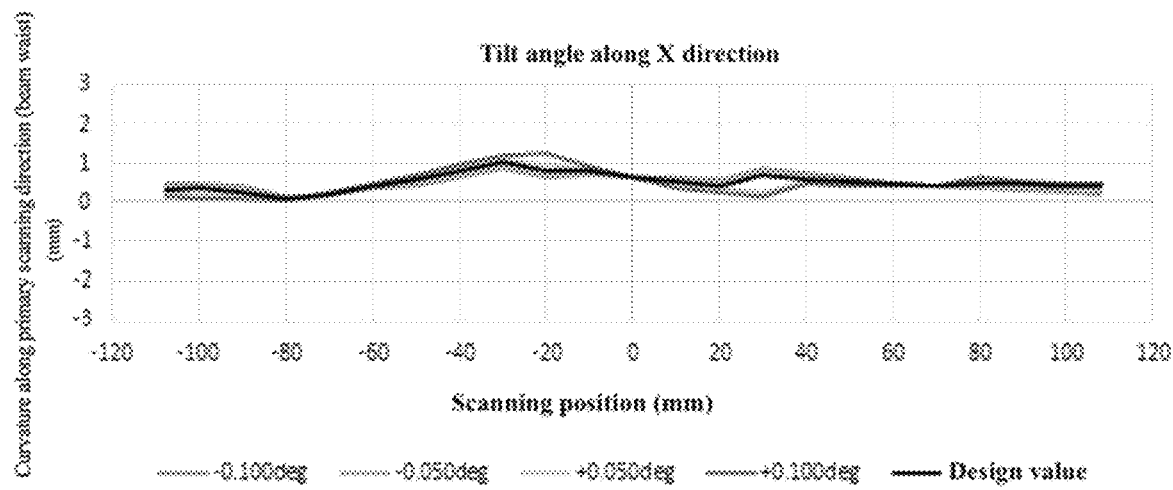
FIG. 16 illustrates a deviation data curve corresponding to light beam tilt angles along an X direction.
Figure 17:
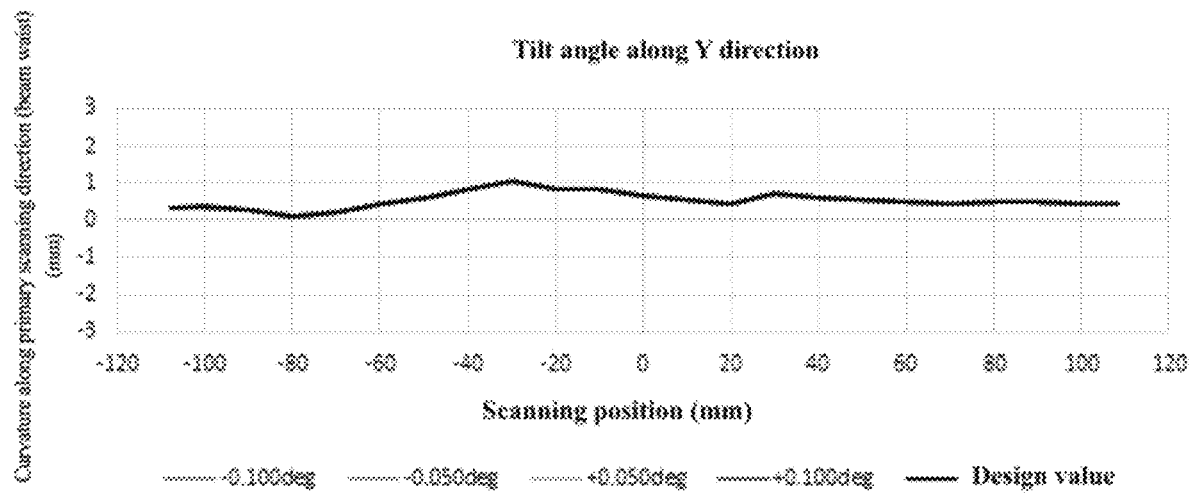
FIG. 17 illustrates a deviation data curve corresponding to light beam tilt angles along a Y direction.
Figure 18:
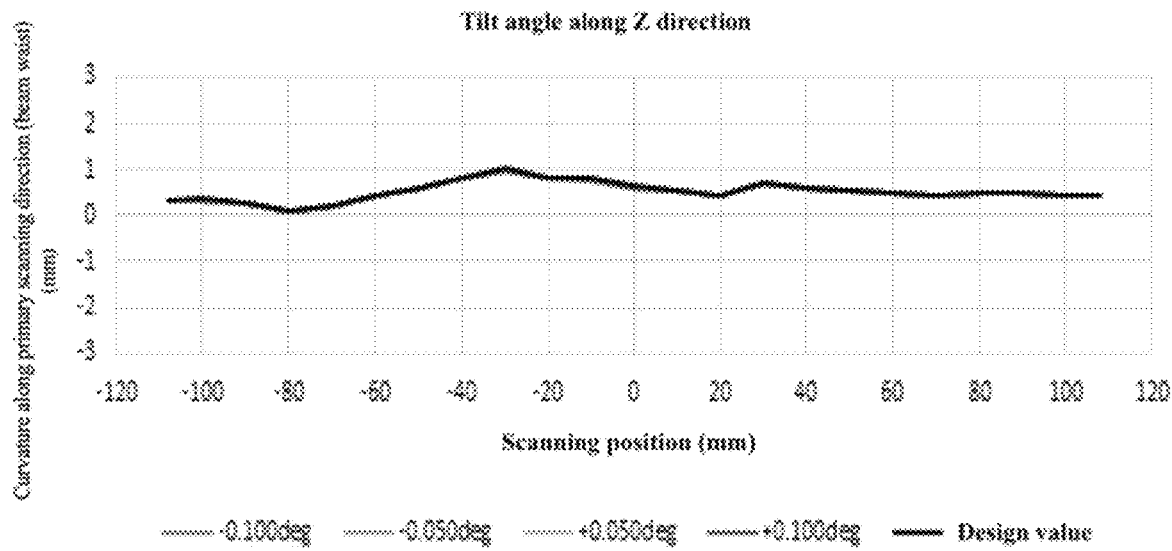
FIG. 18 illustrates a deviation data curve corresponding to light beam tilt angles along a Z direction.

Based on the data in Table 10, FIG. 16 illustrates a deviation data curve corresponding to light beam tilt angles along a X direction; FIG. 17 illustrates a deviation data curve corresponding to light beam tilt angles along a Y direction; and FIG. 18 illustrates a deviation data curve corresponding to light beam tilt angles along a Z direction. It can be seen from the above data curves that, when the above-mentioned expresses are satisfied, the light beam tilt angles along the Y direction, the light beam tilt angles along the X direction, and the light beam tilt angles along the Z direction which are deviated from the design value may be relatively small, and the design specifications for the optical scanning device (unit) may be satisfied.

TABLE 10

| Scanning angle | Scanning position | Design | tilt X | | | | tilt Y | |
|---|---|---|---|---|---|---|---|---|
| | | | −0.100 deg | −0.050 deg | +0.050 deg | +0.100 deg | −0.100 deg | −0.050 deg |
| 26.037818 | −107.9075 | −1.084044 | −1.101308 | −1.093052 | −1.076219 | −1.067743 | −1.088782 | −1.085484 |
| 24.109091 | −99.9059 | −1.397505 | −1.411722 | −1.404924 | −1.390039 | −1.382036 | −1.399856 | −1.398091 |
| 21.698182 | −89.8962 | −1.545753 | −1.586364 | −1.566012 | −1.525454 | −1.505363 | −1.547668 | −1.546095 |
| 19.287273 | −79.9068 | −1.667511 | −1.717797 | −1.69267 | −1.643137 | −1.617657 | −1.668678 | −1.667692 |
| 16.876364 | −69.9089 | −1.71563 | −1.766838 | −1.740574 | −1.68988 | −1.664006 | −1.720502 | −1.71628 |
| 14.465455 | −59.8887 | −1.416124 | −1.499804 | −1.459362 | −1.37324 | −1.331122 | −1.414079 | −1.415396 |
| 12.054545 | −49.8587 | −1.293112 | −1.412733 | −1.352942 | −1.233879 | −1.177244 | −1.291792 | −1.292307 |
| 9.6436364 | −39.8366 | −1.4967 | −1.585455 | −1.540894 | −1.452624 | −1.407887 | −1.498555 | −1.496981 |
| 7.2327273 | −29.8326 | −1.679093 | −1.827922 | −1.753435 | −1.626069 | −1.575405 | −1.681128 | −1.679994 |
| 4.8218182 | −19.847 | −1.634366 | −1.721013 | −1.677774 | −1.591465 | −1.548863 | −1.634504 | −1.634363 |
| 2.4109091 | −9.8734 | −1.43586 | −1.478742 | −1.456852 | −1.414958 | −1.394329 | −1.435949 | −1.43586 |
| 0 | 0.0965 | −1.376929 | −1.358404 | −1.367384 | −1.386768 | −1.39668 | −1.376929 | −1.376929 |
| −2.410909 | 10.0708 | −1.582907 | −1.504429 | −1.543715 | −1.622669 | −1.662802 | −1.582907 | −1.582907 |
| −4.821818 | 20.056299 | −1.881065 | −1.712048 | −1.796635 | −1.966345 | −2.046012 | −1.881708 | −1.881065 |
| −7.232727 | 30.057199 | −1.86447 | −1.681721 | −1.775151 | −1.951416 | −2.038217 | −1.865373 | −1.864504 |
| −9.643636 | 40.073002 | −1.49443 | −1.372159 | −1.444227 | −1.54421 | −1.618493 | −1.495792 | −1.494694 |
| −12.05455 | 50.095699 | −1.20882 | −1.074269 | −1.141327 | −1.276254 | −1.343112 | −1.208686 | −1.209003 |

TABLE 10-continued

| | | | tilt Y | | tilt Z | | | |
|---|---|---|---|---|---|---|---|---|
| −14.46545 | 60.109901 | −1.447608 | −1.346519 | −1.397735 | −1.495357 | −1.534419 | −1.44535 | −1.447163 |
| −16.87636 | 70.1008 | −1.855458 | −1.788193 | −1.821386 | −1.889297 | −1.923136 | −1.858883 | −1.856169 |
| −19.28727 | 80.070702 | −1.887979 | −1.83954 | −1.863744 | −1.912093 | −1.936286 | −1.891418 | −1.88864 |
| −21.69818 | 90.051804 | −1.675674 | −1.614541 | −1.645177 | −1.706903 | −1.737509 | −1.676229 | −1.67573 |
| −24.10909 | 100.0761 | −1.223649 | −1.181772 | −1.202638 | −1.244322 | −1.265322 | −1.226876 | −1.224061 |
| −26.03782 | 108.0956 | −1.405948 | −1.35463 | −1.380516 | −1.43172 | −1.457499 | −1.407808 | −1.406553 |

| Scanning angle | Scanning position | tilt Y | | tilt Z | | | |
|---|---|---|---|---|---|---|---|
| | | +0.050 deg | +0.100 deg | −0.100 deg | −0.050 deg | +0.050 deg | +0.100 deg |
| 26.037818 | −107.9075 | −1.085484 | −1.088782 | −1.097997 | −1.087729 | −1.087729 | −1.097997 |
| 24.109091 | −99.9059 | −1.398091 | −1.399856 | −1.410182 | −1.400424 | −1.400424 | −1.410182 |
| 21.698182 | −89.8962 | −1.546095 | −1.547668 | −1.559368 | −1.549658 | −1.549658 | −1.559368 |
| 19.287273 | −79.9068 | −1.667692 | −1.668678 | −1.681242 | −1.670919 | −1.670919 | −1.681242 |
| 16.876364 | −69.9089 | −1.71628 | −1.720502 | −1.736845 | −1.720885 | −1.720885 | −1.736845 |
| 14.465455 | −59.8887 | −1.415396 | −1.414079 | −1.422297 | −1.417967 | −1.417967 | −1.422297 |
| 12.054545 | −49.8587 | −1.292307 | −1.291792 | −1.301687 | −1.295086 | −1.295086 | −1.301687 |
| 9.6436364 | −39.8366 | −1.496981 | −1.498555 | −1.508996 | −1.499757 | −1.499757 | −1.508996 |
| 7.2327273 | −29.8326 | −1.679994 | −1.681128 | −1.705398 | −1.686076 | −1.686076 | −1.705398 |
| 4.8218182 | −19.847 | −1.634363 | −1.634504 | −1.641427 | −1.63607 | −1.63607 | −1.641427 |
| 2.4109091 | −9.8734 | −1.43586 | −1.435949 | −1.451452 | −1.439561 | −1.439561 | −1.451452 |
| 0 | 0.0965 | −1.376929 | −1.376929 | −1.395726 | −1.381664 | −1.381664 | −1.395726 |
| −2.410909 | 10.0708 | −1.582907 | −1.582907 | −1.591713 | −1.585047 | −1.585047 | −1.591713 |
| −4.821818 | 20.056299 | −1.881065 | −1.881708 | −1.886487 | −1.886487 | −1.886487 | −1.900869 |
| −7.232727 | 30.057199 | −1.864504 | −1.865373 | −1.880909 | −1.868492 | −1.868492 | −1.880309 |
| −9.643636 | 40.073002 | −1.494694 | −1.195792 | −1.506591 | −1.497549 | −1.497549 | −1.506591 |
| −12.05455 | 50.095699 | −1.209003 | −1.208686 | −1.221693 | −1.211954 | −1.211954 | −1.221693 |
| −14.46545 | 60.109901 | −1.447163 | −1.44535 | −1.453872 | −1.449112 | −1.449112 | −1.453872 |
| −16.87636 | 70.1008 | −1.856169 | −1.858883 | −1.876125 | −1.860513 | −1.860513 | −1.876125 |
| −19.28727 | 80.070702 | −1.88864 | −1.891418 | −1.905931 | −1.892405 | −1.892405 | −1.905931 |
| −21.69818 | 90.051804 | −1.67573 | −1.676229 | −1.689432 | −1.679407 | −1.679407 | −1.689432 |
| −24.10909 | 100.0761 | −1.224061 | −1.226876 | −1.241521 | −1.228194 | −1.228194 | −1.241521 |
| −26.03782 | 108.0956 | −1.406553 | −1.407808 | −1.420111 | −1.409461 | −1.409451 | −1.420111 |

The first optical unit 30 may be a single anamorphic lens. The first optical unit 30 may further include a refraction unit and a diffraction unit; and the refraction unit andd the diffraction unit may be respectively arranged on the incident light side and the exit light side of the single anamorphic lens. Or, the first optical unit 30 may be a collimator lens and a cylindrical lens.

It should be noted that the first optical unit 30 may be the single anamorphic lens with the refraction unit and the diffraction unit arranged on the incident light side and the light exit side respectively. The anamorphic lens may have the functions of the collimator lens and the cylindrical lens, and the primary optical axis of the anamorphic lens may be configured corresponding to the light source 10; such that, after the light beam emitted from the light source 10 is collimated by the anamorphic lens, the quality of the light beam directed to the deflection apparatus 20 may be higher. The anamorphic lens may be made of a single lens, which may reduce processing steps and reduce assembly errors. The anamorphic lens may also be a lens group formed by a combination of a collimator lens and a cylindrical lens.

The refractive index change caused by the temperature change of the first optical unit 30, the deflection apparatus 20 or the f-θ lens 40 or the wavelength change caused by the temperature change of the light source 10 may all result in the change of the focal position. Therefore, it may prevent the light emitted from the light source 10 from being accurately focused onto the scanning target surface of the photosensitive unit 210. In one embodiment, in order to compensate possible focal position change due to the temperature change, the first optical unit 30 may include the single anamorphic lens, the refraction unit and the diffraction unit; and the refraction unit and the diffraction unit may be formed into one single piece on the incident light side and the exit light side of the anamorphic lens by injection molding.

In one embodiment, the first optical unit 30 may be the combination of the anamorphic lens, the refraction unit, and the diffraction unit; and the anamorphic lens may be made of a plastic or resin material. Firstly, the plastic and resin materials may be injection molded or die-casted; and such manufacturing method may have great advantage in cost and may better control the production and manufacturing costs. Secondly, the refraction unit and the diffraction unit may be respectively arranged on two sides of the anamorphic lens; and under the joint action of the refraction unit and the diffraction unit, it may also compensate the deviation of the focal position caused by the temperature change, which may be advantageous for improving print quality to a certain extent. In addition, the refraction unit and the diffraction unit may be both arranged on the anamorphic lens, which may effectively reduce the overall volume of the optical scanner 100; the refraction unit and the diffraction unit may be installed with the anamorphic lens as the base; and no separate base may be required to support the refraction unit and the diffraction unit. In such way, the assembly difficulty may be reduced, and the installation steps may be reduced, which may be advantageous for the installation process and the production cost.

Optionally, an aperture diaphragm may be arranged between the first optical unit 30 and the light source 10, or an aperture diaphragm may be arranged between the first optical unit 30 and the deflection apparatus 20.

It should be noted that, firstly, each component may be fixedly installed on the support unit 50, such that the aperture diaphragm may be the hole-structure installed in the direction of the light path corresponding to the support unit 50. The aperture diaphragm may block the edge light, such that the light beam emitted from the light source 10 may pass through the aperture diaphragm into a preset spot shape. Exemplarily, the aperture diaphragm may be configured as a circular aperture diaphragm, an elliptical aperture diaphragm, a square aperture diaphragm, or the like; and the shape of the aperture diaphragm may not be particularly limited, and those skilled in the art may make suitable adjustments according to actual situations.

Secondly, the aperture diaphragm may be arranged between the first optical unit 30 and the light source 10 to constrain the light beam emitted from the light source 10. Or the aperture diaphragm may also be arranged between the first optical unit 30 and the deflection apparatus 20; and correspondingly, the light beam that enters the deflection apparatus 20 after being modulated by the first optical unit 30 may also be constrained. Obviously, the light beam emitted from the light source 10 may not be restricted, that is, the aperture diaphragm may also be omitted.

Figure 5:
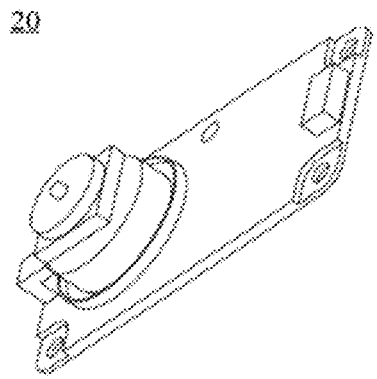
FIG. 5 illustrates a structural schematic of a deflection apparatus in FIG. 4.

Exemplarily, in one embodiment, as shown in FIG. 5, the deflection apparatus 20 may be a deflector having a four-sided mirror, or the deflection apparatus 20 may also be an oscillator.

It should be noted that the deflection apparatus 20 may be also called a light beam scanner, which is an apparatus that changes the propagation direction of the light beam in space according to a certain rule. Normally, the mirror (or polyhedral reflector) may be mechanically rotated to change the incident angle of the light beam to the incident surface of the f-θ lens, thereby achieving the objective of deflecting the reflected light beam. In one embodiment, exemplarily, the polyhedral reflector may be a four-sided mirror. Another commonly used deflector may use electro-optic or acousto-optic effects to change the refractive index of a transparent medium to achieve the objective of deflecting light beams. Such type of deflector may normally be only suitable for the scenario of deflecting a single wavelength laser beam. Another deflection apparatus 20 may be a resonant optical deflector, which may include an oscillator with a micro-oscillation structure and achieve the objective of deflecting the beam by reciprocating torsional oscillation.

As shown in FIGS. 1 and 2, in one embodiment, the optical scanner 100 may further include a synchronization signal detection unit that receives the light beam deflected by the deflection apparatus 20. The synchronization signal detection unit may be configured to obtain a synchronization signal; and the synchronization signal may be configured to determine the starting position where the light beam emitted by the optical scanner 100 is focused onto the scanning target surface of the photosensitive unit 210.

It should be noted that the synchronization signal detection unit may include a synchronization detection sensor and a synchronization detection lens. A part of the light deflected by the deflection apparatus 20 may enter the synchronization detection sensor through the synchronization detection lens. At this point, the synchronization detection sensor may generate the synchronization signal to match the horizontal synchronization of the scan line in the scanning direction.

In one embodiment, the f-θ lens 40 may be made of a plastic material, and the center thickness of the f-θ lens 40 may be d=9 min.

As shown in FIG. 1, various embodiments also provide an electrophotographic image forming apparatus 200. The electrophotographic image forming apparatus 200 may include the above-mentioned optical scanner 100, and further include a photosensitive unit 210 capable of forming a latent image on the surface of the scanning target, a developing unit 220 that develops the latent image on the photosensitive unit 210 into a toner image, a transfer apparatus 230 that transfers the toner image to a transfer medium, and a fixing apparatus 240 that fixes the toner image on the transfer medium. The electrophotographic image forming apparatus 200 may include same structure and beneficial effects as the optical scanner 100 in the above-mentioned embodiments. The structure and beneficial effects of the optical scanner 100 may have been described in detail in the above-mentioned embodiments, which may not be described in detail herein.

The above are only optional embodiments of the present disclosure, and are not used to limit the present disclosure. For those skilled in the art, the present disclosure may have various modifications and changes. The above may merely optional embodiments of the present disclosure, and may not be intended to limit the present disclosure. Any modification, equivalent replacement, improvement and the like made within the spirit and principle of the present disclosure shall be included in the scope of protection of the present disclosure.

What is claimed is:

1. An optical scanner, comprising:
   a light source; and
   a first optical unit, a deflection apparatus, and an f-θ lens, which are sequentially arranged along a primary optical axis direction of a light beam emitted from the light source, wherein:
   the light beam emitted from the light source is focused onto a scanning target surface after sequentially passing through the first optical unit, the deflection apparatus, and the f-θ lens;
   optical scanning directions of the light beam emitted from the light source include a primary scanning direction and a secondary scanning direction which are perpendicular to each other; and
   along the primary scanning direction, the f-θ lens satisfies following expressions:

$SAG1>0$ and $SAG2>0$; and $0<(SAG1+SAG2)/d<0.8$; wherein:

SAG denotes a sag of an incident surface or an exit surface;
   SAG1 is a Z value of the incident surface of the f-θ lens, and SAG2 is a Z value of the exit surface of the f-θ lens, wherein a primary scanning surface is an X-Z plane in an XYZ coordinate system, and a secondary scanning surface is a Y-Z plane in the XYZ coordinate system; and
   d is a center thickness of the f-θ lens.

2. The optical scanner according to claim 1, wherein:
   a magnification of the f-θ lens along the secondary scanning direction is Ms_fθ, which satisfies a following expression:

$-2.44 \leq Ms\_f\theta \leq 2.44$.

3. The optical scanner according to claim 1, wherein:
   the light source includes a first light-emitting point and a second light-emitting point, and the f-θ lens satisfies following expressions along the primary scanning direction:

$SAG1\text{-}0>0, SAG2\text{-}1>0, SAG1\text{-}2>0, SAG2\text{-}2>0$;

$0<(SAG1\text{-}1+SAG2\text{-}1)/d<0.8$; and $0<(SAG1\text{-}2+SAG2\text{-}2)/d<0.8$;

wherein SAG1-1 is a Z value at an intersection of a light beam of the first light-emitting point and the incident surface of the f-θ lens; SAG2-1 is a Z value at an intersection of a light beam of the first light-emitting point and the exit surface of the f-θ lens; SAG1-2 is a Z value at an intersection of a light beam of the second light-emitting point and the incident surface of the f-θ lens; SAG2-2 is a Z value at an intersection of a light beam of the second light-emitting point and the exit surface of the f-θ lens; and d is the center thickness of the f-θ lens.

4. The optical scanner according to claim 1, wherein: the first optical unit is an anamorphic lens.

5. The optical scanner according to claim 4, wherein the anamorphic lens is made of a plastic material or resin material.

6. The optical scanner according to claim 1, wherein an aperture diaphragm is arranged between the first optical unit and the light source, or an aperture diaphragm is arranged between the first optical unit and the deflection apparatus.

7. The optical scanner according to claim 1, wherein the deflection apparatus is a deflector having a four-sided mirror, or the deflection apparatus is an oscillator.

8. The optical scanner according to claim 1, further including a synchronization signal detection unit that receives a light beam deflected by the deflection apparatus.

9. The optical scanner according to claim 1, wherein the f-θ lens is made of a plastic material.

10. An electrophotographic image forming apparatus, comprising: an optical scanner, comprising a light source; and a first optical unit, a deflection apparatus, and an f-θ lens, which are sequentially arranged along a primary optical axis direction of a light beam emitted from the light source, wherein:

the light beam emitted from the light source is focused onto a scanning target surface after sequentially passing through the first optical unit, the deflection apparatus, and the f-θ lens;

optical scanning directions of the light beam emitted from the light source include a primary scanning direction and a secondary scanning direction which are perpendicular to each other; and along the primary scanning direction, the f-θ lens satisfies following expressions:

$SAG1>0$ and $SAG2>0$; and $0<(SAG1+SAG2)/d<0.8$; wherein:

SAG denotes a sag of an incident surface or an exit surface;

SAG1 is a Z value of the incident surface of the f-θ lens, and SAG2 is a Z value of the exit surface of the f-θ lens, wherein a primary scanning surface is an X-Z plane in an XYZ coordinate system, and a secondary scanning surface is a Y-Z plane in the XYZ coordinate system; and d is a center thickness of the f-θ lens;

a photosensitive unit capable of forming a latent image on the scanning target surface, a developing unit that develops the latent image on the photosensitive unit into a toner image, a transfer apparatus that transfers the toner image to a transfer medium, and a fixing apparatus that fixes the toner image on the transfer medium.

* * * * *